United States Patent
Seo

(10) Patent No.: US 10,057,632 B2
(45) Date of Patent: Aug. 21, 2018

(54) OPERATING METHOD OF PORTABLE DEVICE, OPERATING METHOD OF CONTENT REPRODUCING DEVICE, PORTABLE DEVICE, AND CONTENT REPRODUCING DEVICE

(71) Applicant: SAMSUNG ELECTRONICS CO., LTD., Suwon-si (KR)

(72) Inventor: Je-Hwan Seo, Daegu (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/169,867

(22) Filed: Jun. 1, 2016

(65) Prior Publication Data
US 2016/0366468 A1     Dec. 15, 2016

(30) Foreign Application Priority Data
Jun. 12, 2015 (KR) .................. 10-2015-0083412

(51) Int. Cl.
H04N 21/4788 (2011.01)
H04N 21/63 (2011.01)
(Continued)

(52) U.S. Cl.
CPC ... *H04N 21/43615* (2013.01); *G06F 3/04842* (2013.01); *G06F 3/1423* (2013.01);
(Continued)

(58) Field of Classification Search
CPC ... H04N 21/4788; H04N 21/63; H04N 21/632
(Continued)

(56) References Cited

U.S. PATENT DOCUMENTS 6,289,346 B1 * 9/2001 Milewski .......... G06F 17/30017
7,890,661 B2    2/2011 Spurgat et al.
(Continued)

FOREIGN PATENT DOCUMENTS

EP    2763422 A1    8/2014
KR    101111898 B1    2/2012
(Continued)

OTHER PUBLICATIONS

Partial Communication dated Aug. 9, 2016, issued by the European Patent Office in counterpart European Application No. 16174059.2.
(Continued)

*Primary Examiner* — Dominic D Saltarelli
(74) *Attorney, Agent, or Firm* — Sughrue Mion, PLLC

(57) ABSTRACT

An operation method of a portable device, an operation method of a content reproducing device, the portable device, and the content reproducing device are provided. The portable device includes a display, a communication interface configured to receive, from a content reproducing device, a signal comprising information about content being reproduced by the content reproducing device and signal intensity information of the signal; and a controller configured to determine a degree of proximity between the portable device and the content reproducing device based on the signal intensity information, and control the display to display a user interface (UI) for inquiring about whether to start continuously reproducing the content by the portable device in response to the degree of proximity satisfying a predefined condition.

16 Claims, 30 Drawing Sheets

(51) Int. Cl.
    *H04N 21/436* (2011.01)
    *H04N 21/41* (2011.01)
    *H04N 21/4363* (2011.01)
    *H04N 21/647* (2011.01)
    *G06F 3/0484* (2013.01)
    *G06F 3/14* (2006.01)
    *H04N 21/414* (2011.01)
    *H04N 21/443* (2011.01)
    *H04N 21/472* (2011.01)
    *H04N 21/485* (2011.01)
    *H04L 29/06* (2006.01)

(52) U.S. Cl.
    CPC ...... *H04L 65/4084* (2013.01); *H04L 65/4092* (2013.01); *H04L 65/80* (2013.01); *H04N 21/4126* (2013.01); *H04N 21/41407* (2013.01); *H04N 21/43637* (2013.01); *H04N 21/4432* (2013.01); *H04N 21/47217* (2013.01); *H04N 21/485* (2013.01); *H04N 21/647* (2013.01)

(58) Field of Classification Search
    USPC .................................. 725/80; 455/41.1, 41.3
    See application file for complete search history.

(56) References Cited

U.S. PATENT DOCUMENTS

| | | |
|---|---|---|
| 8,955,028 B2 | 2/2015 | Nam |
| 2002/0082730 A1* | 6/2002 | Capps ............... H04N 21/40 700/94 |
| 2002/0120925 A1* | 8/2002 | Logan ................ A23L 2/52 725/9 |
| 2003/0050009 A1* | 3/2003 | Kurisko ............ H04L 63/061 455/41.1 |
| 2009/0125971 A1 | 5/2009 | Belz et al. |
| 2010/0156624 A1 | 6/2010 | Hounsell |
| 2012/0147274 A1 | 6/2012 | Hassan et al. |
| 2012/0254347 A1 | 10/2012 | Seetharam et al. |
| 2013/0115974 A1 | 5/2013 | Lee et al. |
| 2014/0122596 A1 | 5/2014 | Kim et al. |
| 2014/0157303 A1 | 6/2014 | Jo |
| 2014/0273859 A1* | 9/2014 | Luna .................... H04W 4/008 455/41.3 |
| 2014/0323048 A1 | 10/2014 | Kang |
| 2014/0335844 A1 | 11/2014 | Kang et al. |

FOREIGN PATENT DOCUMENTS

| | | |
|---|---|---|
| KR | 101163526 B1 | 7/2012 |
| KR | 101184849 B1 | 9/2012 |

OTHER PUBLICATIONS

"Bluetooth Proximity Profile", Bluetooth SIG web site, Jun. 21, 2011, XP055118502, (21 pages total).

Communication dated Oct. 19, 2016, issued by the European Patent Office in counterpart European Application No. 16174059.2.

Garcia Castano Javier: "Algorithms and Protocols enhancing Mobility Support for Wireless Sensor Networks Based on Bluetooth and Zigbee", Internet Citation, Sep. 2006, XP002483243 (8 pages total, pp. 50-57).

Communication dated Aug. 24, 2016, issued by the International Searching Authority in counterpart International Application No. PCT/KR2016/006068 (PCT/ISA/210 & PCT/ISA/237).

\* cited by examiner

OPERATING METHOD OF PORTABLE DEVICE, OPERATING METHOD OF CONTENT REPRODUCING DEVICE, PORTABLE DEVICE, AND CONTENT REPRODUCING DEVICE

CROSS-REFERENCE TO RELATED APPLICATION

This application claims the benefit of Korean Patent Application No. 10-2015-0083412, filed on Jun. 12, 2015 in the Korean Intellectual Property Office, the disclosure of which is incorporated herein by reference in its entirety.

BACKGROUND

1. Field

Apparatuses and methods consistent with exemplary embodiments relate to an operation method of a portable device, an operation method of a content reproducing device, the portable device, and the content reproducing device.

2. Description of the Related Art

A service of providing or streaming the same content to various devices such as a television (TV), a personal computer (PC), a tablet PC, and a cellular phone is known as an N-screen service. An initial form of the N-screen service was to provide a single piece of content to various types of devices. A representative example of the initial form of the N-screen service is that cable TV and Internet protocol TV (IPTV) service providers provide content to another type of device, besides a TV, such as a tablet PC or a smartphone.

The term "mirroring" indicates a function of transmitting a video/voice by directly connecting between devices through a Wi-Fi wireless network.

The term "Chromecast" indicates a function of transmitting wireless data via an access point, in detail, a function of transmitting a uniform resource locator (URL) of a location where video data is stored, through a dedicated application (e.g., YouTube) supporting Chromecast instead of direct transmission of the video data and receiving, by Chromecast, the video data from the URL and outputting the video data as a high definition multimedia interface (HDMI) output.

However, to use the mirroring or Chromecast function, pairing between devices or wireless access points needs to be previously performed. In addition, the use of both of the two functions, the mirroring and Chromecast functions, is limited to a restricted space in which a Wi-Fi network is formed in home. In the case of mirroring, since direct Wi-Fi communication between a mobile device and a TV is used, the use of mirroring is limited to a restricted space in a home. Even in the case of Chromecast, there is also a limitation in that Chromecast cannot be used outside a Wi-Fi network formed in a home.

In addition, both of the two functions have a uni-directional property of providing only a data transmission function from a mobile device to a smart TV. That is, both of the two functions provide only a function of displaying content of a mobile device on a screen of a smart TV, and it is difficult to use both of the two functions for a function of displaying content of a TV on a screen of a mobile device.

SUMMARY

One or more exemplary embodiments provide an operation method of a portable device, an operation method of a content reproducing device, the portable device, and the content reproducing device, by which a function of continuously reproducing content between a plurality of devices without requiring a complicated procedure is provided.

According to an aspect of an embodiment, a portable device includes: a display; a communication interface configured to receive, from a content reproducing device, a signal comprising information about content being reproduced by the content reproducing device and signal intensity information of the signal; and a controller configured to determine a degree of proximity between the portable device and the content reproducing device based on the signal intensity information, and control the display to display a user interface (UI) for inquiring about whether to start continuously reproducing the content by the portable device in response to the degree of proximity satisfying a predefined condition.

The controller may be further configured to access the content based on the information about the content in response to a user input of selecting continuous play.

The signal may contain time information, and the controller may be further configured to control the content being reproduced by the content reproducing device to be continuously reproduced based on the time information.

The signal intensity information may include at least one of transmission power information and a received signal strength indicator (RSSI).

The controller may be further configured to transmit a signal containing information about content being reproduced by the portable device to the content reproducing device.

The signal may include a Bluetooth beacon signal.

According to an aspect of another embodiment, there is provided a portable device including: a communication interface configured to transmit, to a content reproducing device, a signal comprising information about content being reproduced by the portable device and transmission power information of the signal and receive, from the content reproducing device, a received signal strength indicator (RSSI) of the signal that is measured by the content reproducing device; and a controller configured to determine a degree of proximity between the portable device and the content reproducing device based on the transmission power information and the RSSI, and output a user interface for inquiring about whether to start continuously reproducing the content by the content reproducing device in response to the degree of proximity satisfying a predefined condition.

The controller may be further configured to control the communication interface to transmit, to the content reproducing device, a command that instructs the content reproducing device to reproduce the content being reproduced by the portable device in response to a user input of selecting continuous play.

The controller may be further configured to transmit, to the content reproducing device, a command that wakes up the content reproducing device in response to a user input of selecting continuous play.

According to an aspect of another embodiment, a content reproducing device includes: a communication interface configured to transmit, to a portable device, a first signal comprising state information of the content reproducing device and transmission power information of the signal, and receive, from the portable device, a second signal comprising information about content being reproduced by the portable device and a received signal strength indicator (RSSI) of the first signal that is measured by the portable device; and a controller configured to control the content to be continuously reproduced by the content reproducing device based on the information about the content included in the second signal, in response to a user input of selecting continuous play of the content.

The controller may be further configured to determine a degree of proximity between the portable device and the content reproducing device based on the transmission power information and the RSSI, and output a user interface for inquiring about whether to start reproducing the content by the content reproducing device in response to the calculated degree of proximity satisfying a predefined condition.

The controller may be further configured to receive, from the portable device, a third signal including a wake-up command that instructs the content reproducing device in a standby mode switches to a normal mode, and access the content based on the received information about the content, and control reproduction of the accessed content.

According to an aspect of another embodiment, an operating method of a portable device includes: receiving, from the content reproducing device, a signal comprising information about content being reproduced by a content reproducing device and signal intensity information of the signal; determining a degree of proximity between the portable device and the content reproducing device based on the signal intensity information; and outputting a user interface for inquiring about whether to start continuously reproducing the content by the portable device in response to the degree of proximity satisfying a predefined condition.

According to an aspect of another embodiment, an operating method of a portable device includes: transmitting, to a content reproducing device, a signal comprising information about content being reproduced by the portable device and signal intensity information of the signal; receiving, from the content reproducing device, a received signal strength indicator (RSSI) of the signal that is measured by the content reproducing device; determining a degree of proximity between the portable device and the content reproducing device based on the transmission power information and the RSSI; and outputting a user interface for inquiring about whether to start continuously reproducing the content in response to the degree of proximity satisfying a predefined condition.

According to an aspect of another embodiment, an operating method of a content reproducing device includes: transmitting, to a portable device, a first signal comprising state information of the content reproducing device and signal intensity information of the signal; receiving, from the portable device, a second signal comprising information about content being reproduced by the portable device and a received signal strength indicator (RSSI) of the first signal that is measured by the portable device; and continuously reproducing the content being reproduced by the portable device based on the information about the content included in the second signal, in response to a user input of selecting continuous play of the content.

According to an aspect of another exemplary embodiment, there is provided a portable device including: a transceiver configured to receive, from a content reproducing device, a signal comprising information of transmission power of the signal and an identifier of content being produced by the content reproducing device; and a controller configured to measure a power strength of the received signal, determine whether a distance between the portable device and the content reproducing device is greater than a threshold based on a difference between the transmission power and the measured power strength, and access a server to search for the content based on the identifier of the content in response to the distance being determined as greater than the threshold.

The transceiver may be further configured to receive, from the content reproducing device, information of an elapsed time indicating an amount of time that has passed since the content starts to be reproduced by the content reproducing device.

The controller may be further configured to reproduce the content from the elapsed time.

The portable device may further comprise display configured to display a user interface inquiring a user whether to reproduce the content in response to the controller determining that the distance is greater than the threshold.

BRIEF DESCRIPTION OF THE DRAWINGS

The above and/or other aspects will be more apparent by describing certain exemplary embodiments, with reference to the accompanying drawings, in which.

DETAILED DESCRIPTION

Figure 1A:
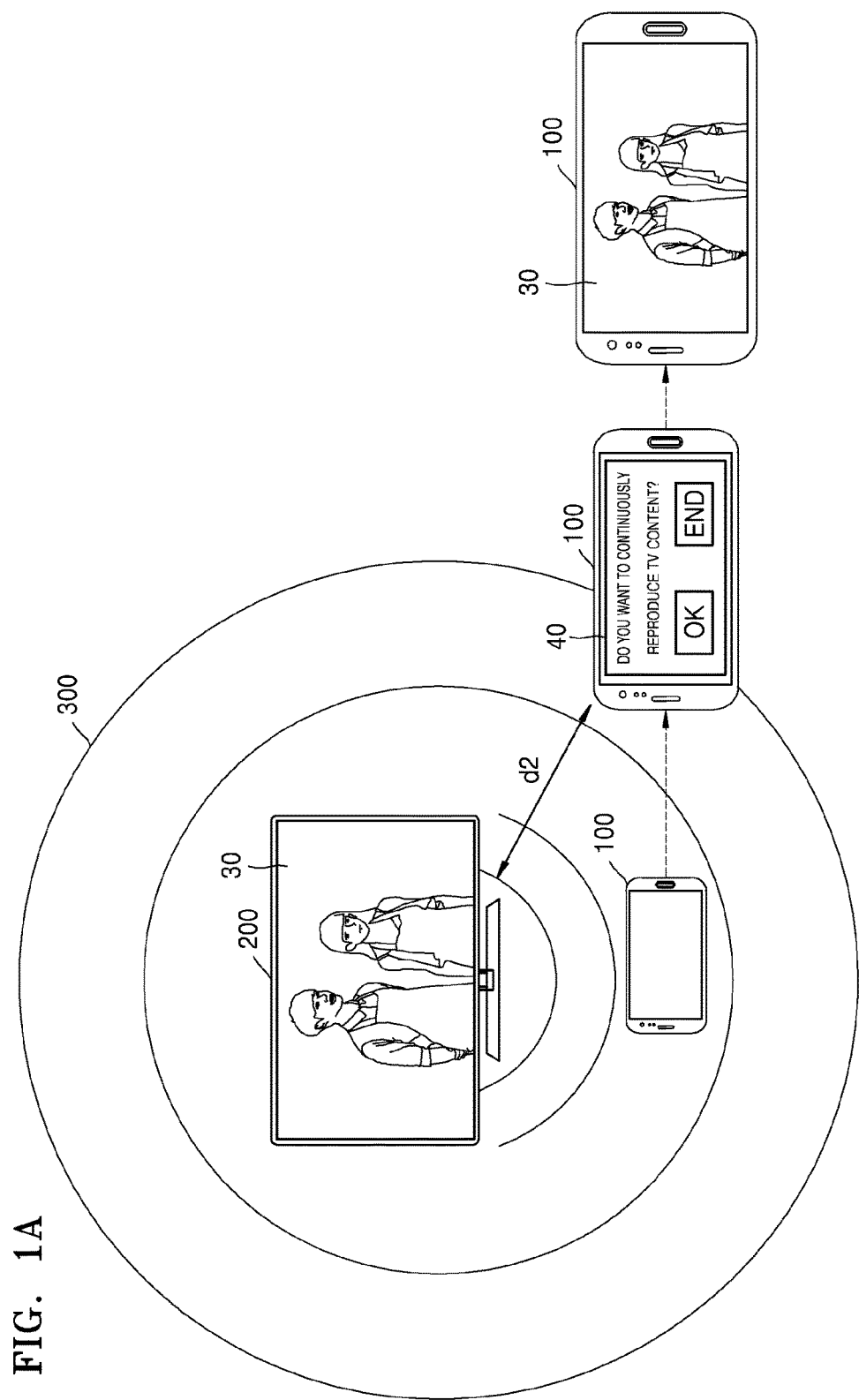
FIG. 1A illustrates a reference diagram for describing the concept of an operation of continuously reproducing content, which is being watched through a content reproducing device, by using a portable device, according to an exemplary embodiment.

Exemplary embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the exemplary embodiments. However, it is apparent that the exemplary embodiments can be practiced without those specifically defined matters. Also, well-known functions or constructions are not described in detail since they would obscure the description with unnecessary detail.

The expression 'include', 'may include', or the like used in describing various exemplary embodiments indicates the existence of a disclosed corresponding function, operation, component, or the like without limiting additional one or more other functions, operations, components, or the like. In addition, in the various exemplary embodiments, it should be understood that terms, such as 'include' and 'have', are used to indicate the existence of an implemented feature, number, step, operation, element, part, or a combination thereof without excluding in advance the possibility of the existence or addition of one or more other features, numbers, steps, operations, elements, parts, or combinations thereof.

In the various exemplary embodiments, the expression 'or' includes any and all combinations of words listed together. For example, 'A or B' may include A, B, or both A and B.

The expressions, such as 'first' and 'second', used in the various exemplary embodiments may modify various components of various exemplary embodiments but do not limit corresponding components. For example, the expressions do not limit a sequence and/or importance of corresponding components. The expressions may be used to distinguish one component from another component. For example, a first user device and a second user device are all user devices and indicate different user devices. For example, without departing from the right scope of the exemplary embodiments, a first component may be named a second component, and likewise, the second component may also be named the first component.

When it is described that a certain element is 'connected' or 'linked' to another element, it should be understood that the certain element may be connected or linked to another element directly or via another element in the middle. In contrast, when a certain element is 'directly connected' or 'directly linked' to another element, it should be understood that any other element does not exist in the middle.

The terminology used in the various exemplary embodiments is used only to describe specific exemplary embodiments and does not have any intention to limit the inventive concept. An expression in the singular includes an expression in the plural unless they are clearly different from each other in context.

All terms used herein including technical or scientific terms have the same meaning as those generally understood by those of ordinary skill in the art unless they are defined differently. It should be understood that terms generally used, which are defined in a dictionary, have the same meaning as in context of related technology, and the terms are not understood as ideal or excessively formal meaning unless they are clearly defined in the application.

As used herein, the term "and/or" includes any and all combinations of one or more of the associated listed items. Expressions such as "at least one of," when preceding a list of elements, modify the entire list of elements and do not modify the individual elements of the list.

FIG. 1A illustrates a reference diagram for describing the concept of an operation of continuously reproducing content 30, which is being watched via a content reproducing device (e.g., a TV) 200, by using a portable device 100, according to an exemplary embodiment.

Referring to FIG. 1A, a user may be supposed to or desire to leave a TV watchable space 300 while watching the content 30 output from a TV 200 in the TV watchable space 300. For example, the user may have to go to another room or go out while watching the TV 200 in a living room in which the TV 200 is installed. In this case, the user may desire to continuously watch the content 30 being reproduced by the TV 200 even after the user leaves the TV watchable space 300. Therefore, in this case, a service may be provided to allow the user to continuously watch the content 30, which is being reproduced by the TV 200, by using another electronic device or portable terminal owned by the user.

To this end, according to one or more exemplary embodiments, while the portable device 100 is in a proximity range of the TV 200, the TV 200 periodically transmits a signal including information about the content 30 being reproduced by the TV 200 and signal strength information to the portable device 100. The portable device 100 may determine a degree of proximity between the TV 200 and the portable device 100 based on the signal strength information of the signal received from the TV 200. When the portable device 100 detects that the determined degree of proximity is lower than a predefined threshold value d2, the portable device 100 may output a popup window 40 for inquiring about continuous play of TV content. If the user inputs a selection on continuous play in response to the popup window 40, the portable device 100 may access the content 30 via a network by referring to the information about the content 30, which has been received from the TV 200 and reproduce the content 30 via the portable device 100.

Figure 1B:
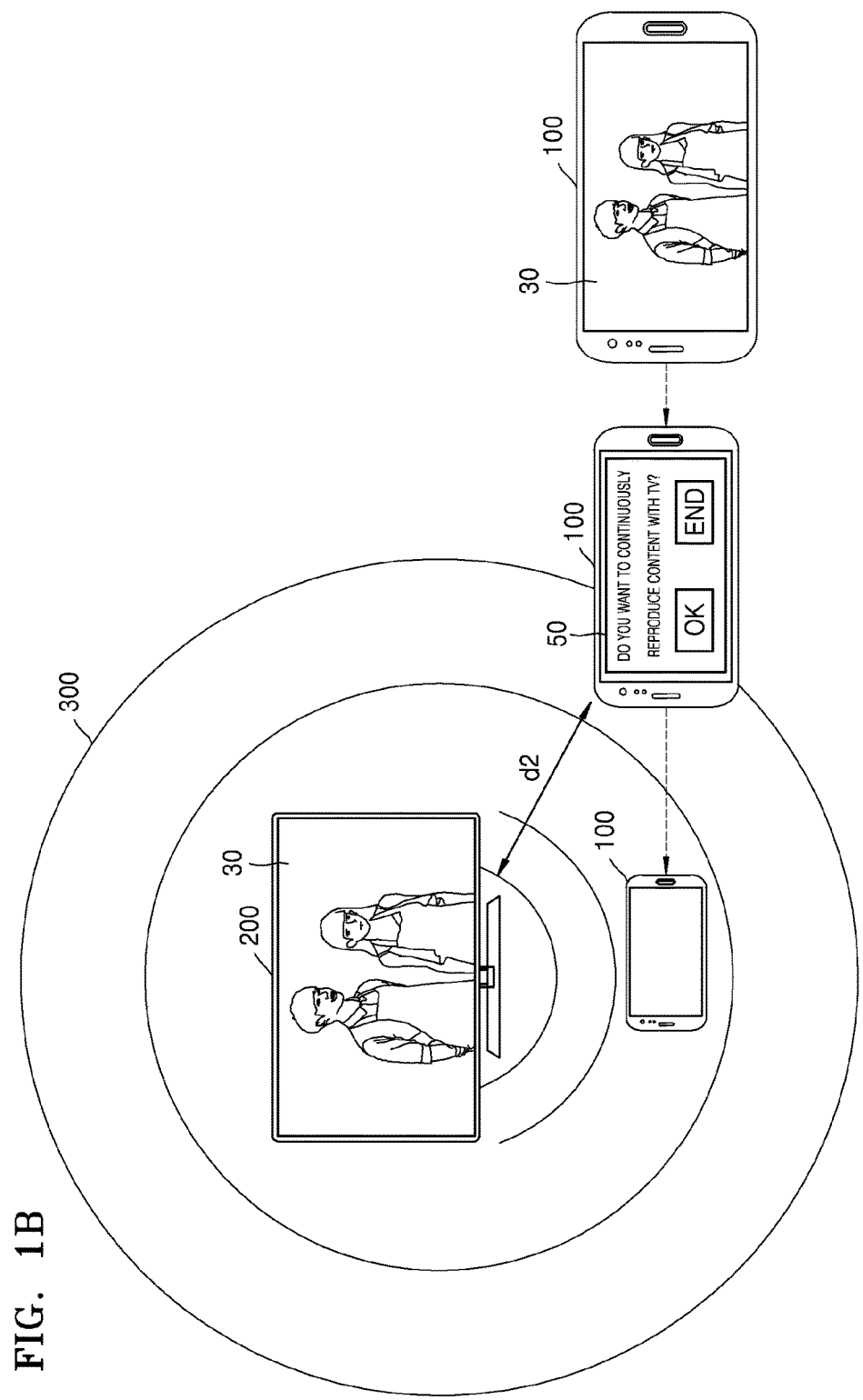
FIG. 1B illustrates a reference diagram for describing the concept of an operation of continuously reproducing content, which is being reproduced by the portable device, by using the content reproducing device, according to an exemplary embodiment.

FIG. 1B illustrates a reference diagram for describing the concept of an operation of continuously reproducing the content 30, which is being reproduced by the portable device 100, by using the content reproducing device (e.g., a TV) 200, according to an exemplary embodiment.

Referring to FIG. 1B, the user may move to the TV watchable space 300 while watching the content 30 via the portable device 100. For example, the user may move to the living room in which the TV 200 is placed while watching the content 30 via the portable device 100 in another room or outside a house. In this case, the user may desire to continuously watch the content 30 being reproduced by the portable device 100, via a relatively large screen of the TV 200 instead of a small screen of the portable device 100. Therefore, in this case, a service may be provided to allow the user to continuously watch the content 30, which is being reproduced by the portable device 100, by using the TV 200.

To this end, according to one or more exemplary embodiments, the portable device 100 periodically transmits a signal including information about the content 30 being reproduced by the portable device 100 and signal strength information to the TV 200. In addition, the TV 200 periodically transmits a signal including signal strength information to the portable device 100. If a degree of proximity between the portable device 100 and the TV 200 is very low, the portable device 100 cannot receive the signal from the TV 200, but if a distance between the portable device 100 and the TV 200 is short, that is, the degree of proximity is high, the portable device 100 may receive the signal from the TV 200. The portable device 100 may determine a degree of proximity between the portable device 100 and the TV 200 based on the signal strength information included in the signal received from the TV 200. When the portable device 100 detects that the determined degree of proximity is higher than the predefined threshold value d2, the portable device 100 may detect that the portable device 100 is within a TV watchable range, and accordingly, the portable device 100 may output a popup window 50 for inquiring about continuous play of the portable device content. If the user inputs a selection with respect to continuous play in response to the popup window 50, the portable device 100 may transmit a signal corresponding to the user's content continuous play selection input to the TV 200, and the TV 200 may access the content 30 via a network by referring to the information about the content 30, which has been received from the portable device 100, and reproduce the content 30 through the TV 200.

As described above, by periodically transmitting and receiving a signal including information about content between two devices, i.e., a content reproducing device and a portable device, desiring to share the content, seamless reproduction of the content between a plurality of devices may be provided without a user being inconvenienced with a complicated procedure.

Figure 2:
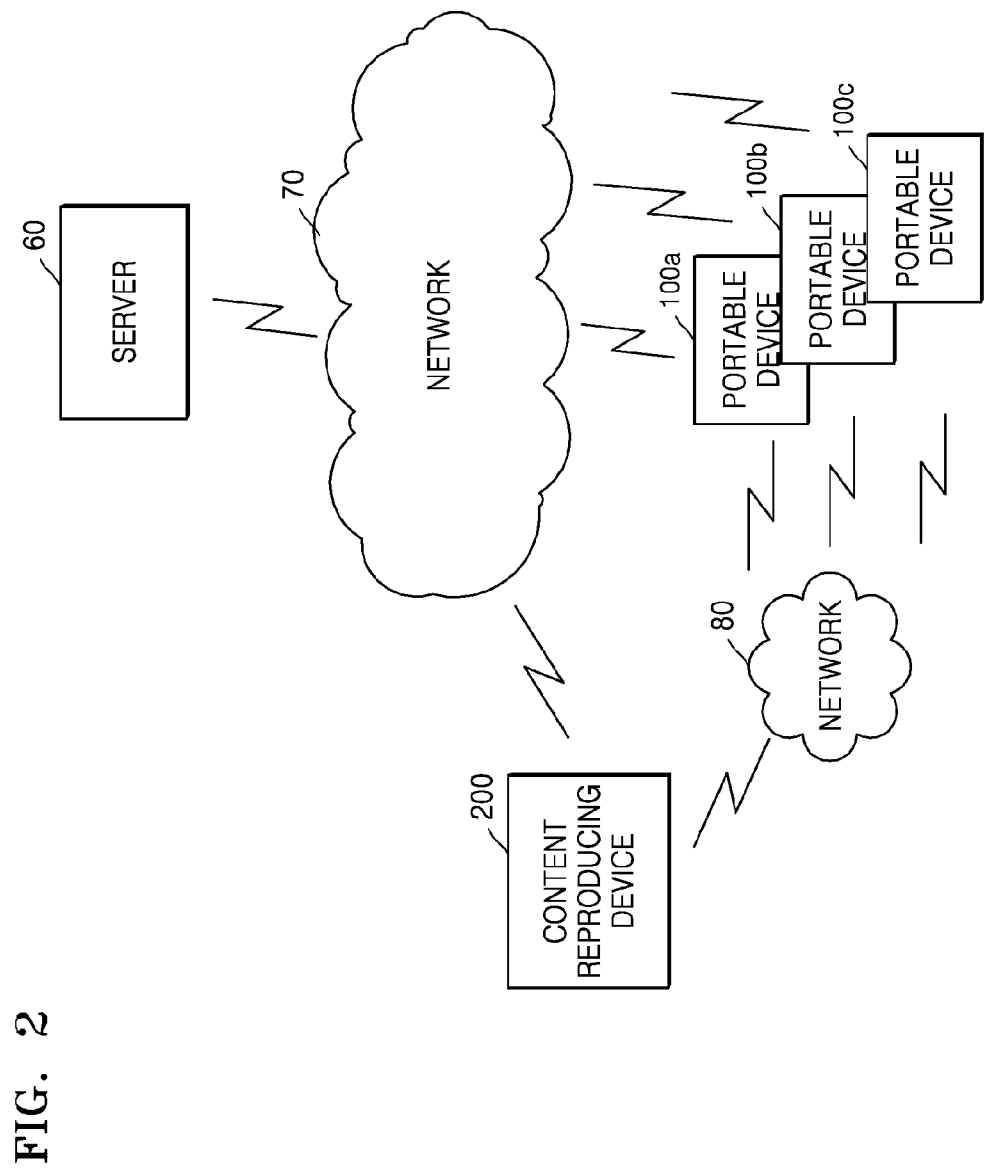
FIG. 2 illustrates a block diagram of a system for performing an operation of continuously reproducing content, according to an exemplary embodiment.

FIG. 2 illustrates a block diagram of a system for performing an operation of continuously reproducing content, according to an exemplary embodiment.

Referring to FIG. 2, the system may include the content reproducing device 200, the portable device 100, and a server 60 which may communicate via a network 70.

The server 60 may provide various pieces of content to the content reproducing device 200 and the portable device 100 via the network 70. The server 60 may be any computing device including a communication interface and a processor and capable of providing content. For example, the server 60 providing content may include servers owned and managed by content providers such as Netflix™, Amazon™, Tving™, and Kootv™.

Content may include video, audio, images, games, applications and the like. Content may be received through a terrestrial broadcast signal, an internet protocol TV (IPTV), a video on demand (VOD) signal, a signal received by accessing the Internet such as YouTube, or the like.

The content reproducing device 200 and the portable device 100 may access the server 60 via the network 70 and reproduce content received from the server 60. The network 70 may be a telecommunications network. The telecommunications network may include at least one of a computer network, the Internet, Internet of Things, and a telephone network.

The content reproducing device 200 and the portable device 100 may transmit and receive information about content and signal strength information via a network 80. The network 80 may include at least one of communication networks such as a Bluetooth communication network, a Wi-Fi communication network, a Bluetooth low energy (BLE) communication network, an infrared communication network, and a laser beam communication network.

The content reproducing device 200 may output or reproduce various pieces of content according to a control signal selected by the user. The content reproducing device 200 may access the server 60 via the network 70 and output content received from the server 60. It will be easily understood by those of ordinary skill in the art that the content reproducing device 200 may be implemented by an analog TV, a digital TV, a three-dimensional (3D) TV, a smart TV, a light-emitting diode (LED) TV, an organic LED (OLED) TV, a plasma TV, a monitor, a set-top box, or the like but is not limited thereto. The content reproducing device 200 may include not only a device for outputting audio/video data, such as a TV as described above, but also an audio device.

According to an exemplary embodiment, the content reproducing device 200 may periodically transmit a signal including information about content being output by the content reproducing device 200 and signal strength information to the portable device 100.

According to an exemplary embodiment, the content reproducing device 200 may wake up from a standby mode according to control via a signal from the portable device 100, access content by referring to information about the content, which is received from the portable device 100, and reproduce the content.

The content reproducing device 200 may be a device for reproducing content by operating a communication interface, a processor, and a display which are included therein. According to one or more exemplary embodiments, the content reproducing device 200 may be referred to as an external device, a digital device, or an electronic device.

The portable device 100 may reproduce or output various pieces of content in response to a user input. The portable device 100 may access the server 60 via the network 70 and output content received from the server 60.

The portable device 100 may include at least one of a smartphone, a tablet personal computer (PC), a mobile phone, a video phone, an e-book reader, a laptop PC, a netbook computer, a personal digital assistant (PDA), a portable multimedia player (PMP), an MP3 player, a wearable device, and a smart watch.

According to an exemplary embodiment, the portable device 100 may periodically transmit a signal including information about content being reproduced by the portable device 100 and signal strength information to the content reproducing device 200.

According to an exemplary embodiment, the portable device 100 may determine a degree of proximity between the portable device 100 and the content reproducing device 200 by using signal strength information included in a signal received from the content reproducing device 200.

According to an exemplary embodiment, the portable device 100 may output a user interface (UI) for inquiring about whether to continuously reproduce content, which is being reproduced by the content reproducing device 200, by using the portable device 100 if the degree of proximity between the portable device 100 and the content reproducing device 200 satisfies a predefined condition. If the user selects to continuously play the content in response to the UI, the portable device 100 may access and reproduce the content based on content information received from the content reproducing device 200.

According to an exemplary embodiment, the portable device 100 may output a UI for inquiring about whether to continuously reproduce content, which is being reproduced by the portable device 100, by using the content reproducing device 200 if the degree of proximity between the portable device 100 and the content reproducing device 200 satisfies the predefined condition. If the user selects to continuously play the content in response to the UI, the portable device 100 may transmit, to the content reproducing device 200, a command indicating that the content being reproduced by the portable device 100 is reproduced by the content reproducing device 200.

According to an exemplary embodiment, the portable device 100 in the system of FIG. 2 may be plural in number. For example, in the system, portable devices 100a, 100b, and 100c may exist. The content reproducing device 200 may transmit a signal including information about content being reproduced by the content reproducing device 200 to each of the portable devices 100a, 100b, and 100c. In addition, each of the portable devices 100a, 100b, and 100c may transmit a signal including information about content being reproduced thereby to the content reproducing device 200.

The portable device 100 may a device for processing a command according to a user input by operating a communication interface, a processor, and a display which are included therein and may be referred to as an electronic device in one or more exemplary embodiments.

Figure 3A:
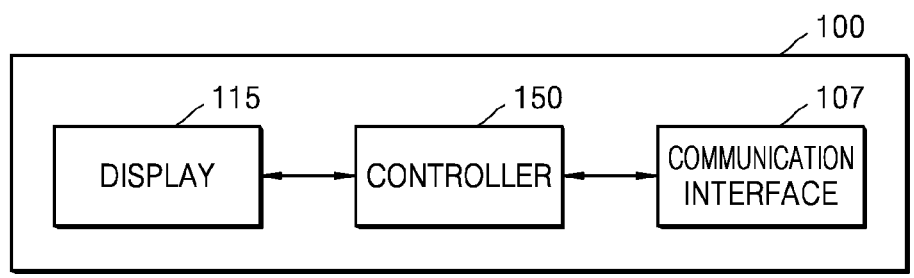
FIG. 3A illustrates a block diagram of the portable device according to an exemplary embodiment.

FIG. 3A illustrates a block diagram of the portable device 100 according to an exemplary embodiment.

Referring to FIG. 3A, the portable device 100 may include a display 115, a controller 150, and a communication interface 107.

The display 115 outputs a screen image or content provided by the controller 150. The display 115 may output a UI for inquiring about continuous play of content through the screen image.

The communication interface 107 may receive a broadcast signal from an external device. For example, the communication interface 107 may communicate with the server 60 and the content reproducing device 200 to receive the broadcast signal. The communication interface 107 may be implemented by a transceiver.

According to an exemplary embodiment, the communication interface 107 may receive information about content being reproduced by the content reproducing device 200 or transmit information about content being reproduced by the portable device 100 to the content reproducing device 200, by using at least one of Wi-Fi communication, Bluetooth communication, BLE communication, infrared communication, and laser beam communication.

According to an exemplary embodiment, the communication interface 107 may access a server for providing content and receive the content by using at least one of third generation (3G), 3G partnership project (3GPP), 4G, and Wi-Fi communication schemes.

The controller 150 may control a plurality of components including the display 115 and the communication interface 107 of the portable device 100. The controller 150 may include a random access memory (RAM), which stores a signal or data input from the outside of the portable device 100 or is used as a storage region corresponding to various tasks performed by the portable device 100, a read only memory (ROM) in which a control program for controlling peripheral devices is stored, and a processor. The processor may be implemented by a system on chip (SoC) in which a core and a graphic processing unit (GPU) are integrated. In addition, the processor may include a plurality of processors.

According to an exemplary embodiment, the controller 150 may periodically receive a signal including information about content being reproduced by the content reproducing device 200 and signal strength information from the content reproducing device 200. This signal may include a Bluetooth beacon signal.

According to an exemplary embodiment, the controller 150 may determine a degree of proximity between the portable device 100 and the content reproducing device 200 based on the signal strength information.

According to an exemplary embodiment, the controller 150 may output, to the display 115, a notification for inquiring about whether to continuously reproduce the content, which is being reproduced by the content reproducing device 200, by using the portable device 100 if the degree of proximity between the portable device 100 and the content reproducing device 200 satisfies the predetermined condition.

According to an exemplary embodiment, the controller 150 may access the content based on the content information received from the content reproducing device 200 in response to a user input of selecting continuous play and reproduce the accessed content through the display 115.

According to an exemplary embodiment, the controller 150 may further receive information about an elapsed time of playing the content from the content reproducing device 200 and control the display 115 to continuously reproduce the content being reproduced by the content reproducing device 200 by using the elapsed time information.

According to an exemplary embodiment, the signal strength information received from the content reproducing device 200 may include at least one of transmission power information and a received signal strength indicator (RSSI).

According to an exemplary embodiment, the controller 150 may transmit a signal including information about content being activated or reproduced by the portable device 100 to the content reproducing device 200 via the communication interface 107.

According to an exemplary embodiment, the controller 150 may periodically transmit a signal including information about content being output through the display 115 and signal strength information to the content reproducing device 200 and periodically receive a signal including signal strength information from the content reproducing device 200.

According to an exemplary embodiment, the controller 150 may determine a degree of proximity between the portable device 100 and the content reproducing device 200 based on the received signal strength information and output, to the display 115, a notification for inquiring about whether to continuously reproduce the content, which is being output through the display 115, by using the content reproducing device 200 if it is detected that the degree of proximity satisfies the predefined condition.

According to an exemplary embodiment, the controller 150 may transmit, to the content reproducing device 200, a signal including a command indicating that the content reproducing device 200 reproduces the content being output through the display 115, in response to a user input of selecting continuous play.

According to an exemplary embodiment, the controller 150 may transmit, to the content reproducing device 200, a signal including a command for waking up the content reproducing device 200 in the standby mode, in response to a user input of selecting continuous play.

Figure 3B:
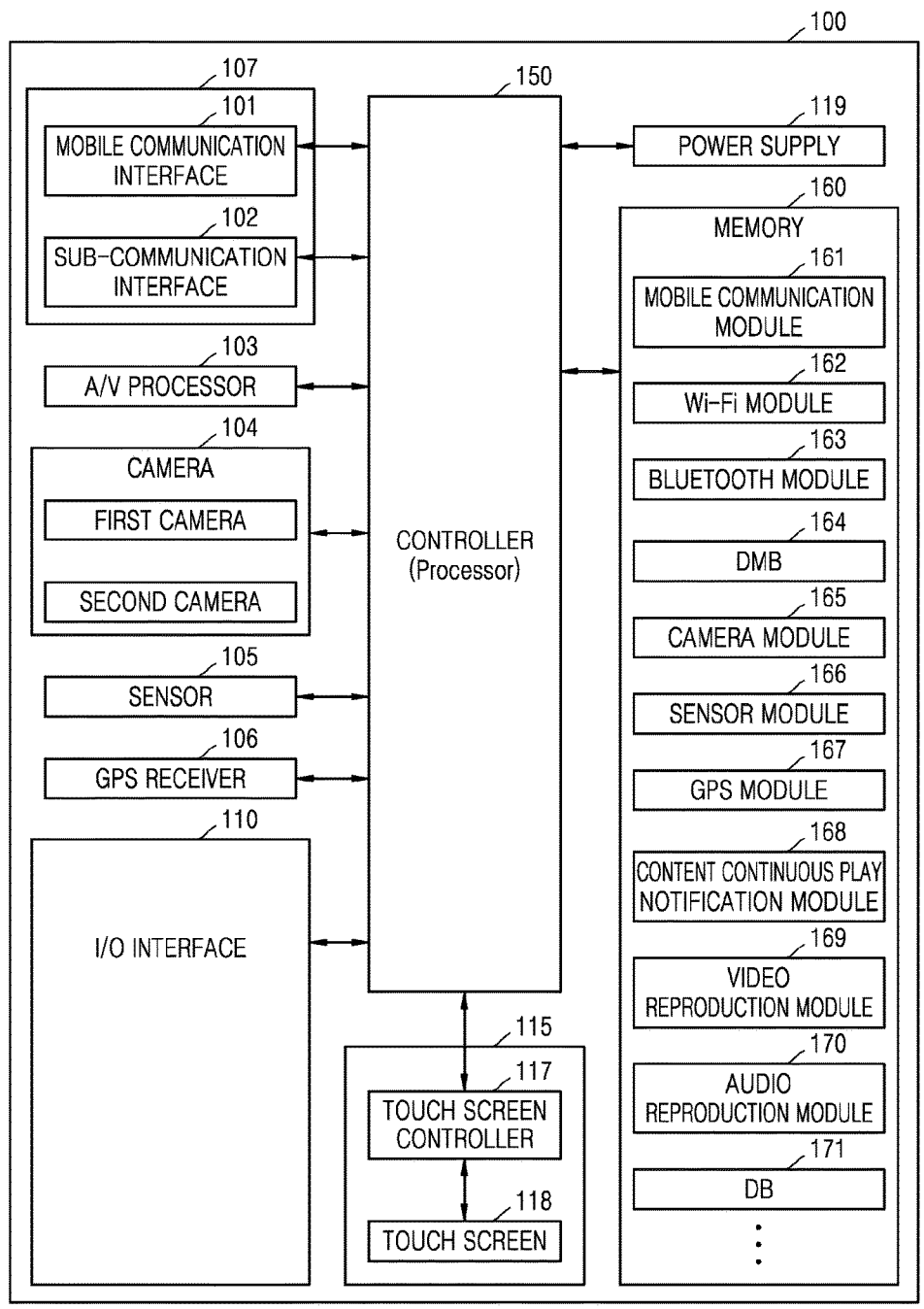
FIG. 3B illustrates a detailed block diagram of the portable device of FIG. 3A.

FIG. 3B illustrates a detailed block diagram of the portable device 100 of FIG. 3A.

The portable device 100 may further include a universal serial bus (USB) port through which a USB connector is inserted and ejected, various external input ports for connecting to various external terminals of a headset, a mouse, a local area network (LAN), and the like, a digital multimedia broadcasting (DMB) chip for receiving and processing a DMB signal, various sensors, and the like according to exemplary embodiments. In addition, according to exemplary embodiments, names of components of the portable device 100 may vary, and some components may be omitted, or other additional components may be further included.

The communication interface 107 may include a mobile communication interface 101 and a sub-communication interface 102.

The mobile communication interface 101 performs broadband network communication according to various communication standards such as 3G, 3GPP, and long term evolution (LTE).

According to an exemplary embodiment, the mobile communication interface 101 may access a server for providing content by referring to information about content being reproduced by the content reproducing device 200, which is included in a Bluetooth beacon signal received from the content reproducing device 200, and access the content. The access to the content may be performed by using a Wi-Fi protocol included in the sub-communication interface 102.

The sub-communication interface 102 communicates with a peripheral device by using a short-distance communication protocol such as a Bluetooth protocol, a Wi-Fi protocol, a near field communication (NFC) protocol, an infrared communication protocol, or a laser beam communication protocol.

According to an exemplary embodiment, the sub-communication interface 102 may periodically receive a Bluetooth beacon signal including content information from an external device (e.g., the content reproducing device 200) by using the Bluetooth protocol. Besides, the sub-communication interface 102 may receive content information by using at least one of Wi-Fi communication, NFC, infrared communication, and laser beam communication.

According to an exemplary embodiment, the received Bluetooth beacon signal may include information about content being reproduced by the content reproducing device 200 and signal strength information. The information about content may include a content identifier and content access information to be used to access the content. The signal strength information may include at least one of transmission power and an RSSI.

According to an exemplary embodiment, the received Bluetooth beacon signal may further include time information in addition to the information about content and the signal strength information, wherein the time information may include total play time information and play elapsed time information. The total play time information indicates a total time to be taken to reproduce the content, and the play elapsed time information indicates time information of a point where the content is currently being reproduced. For example, the total play time information may be expressed by 2:00, and the play elapsed time information may be expressed by 00:37. That is, the total play time information and the play elapsed time information may indicate that the user has watched the content for 37 minutes among a total of two hours. As another example, the time information may be expressed by using a total play length and a play elapsed length.

An audio/video (A/V) processor 103 may process audio data and video data included in content received from the outside or stored in a memory 160. The A/V processor 103 may perform various types of image processing, such as decoding, scaling, noise filtering, frame rate conversion, and resolution conversion, on the video data. In addition, the A/V processor 103 may perform various types of processing, such as decoding, amplification, and noise filtering, on the audio data. When a reproduction application for multimedia content is executed, the controller 150 may operate the A/V processor 103 to reproduce corresponding content. A speaker included in an input/output (I/O) interface 110 outputs an audio signal received from the A/V processor 103.

A camera 104 includes a lens and optical elements for capturing a picture or a video. Although FIG. 3B shows two cameras, one camera or three or more cameras may be included according to exemplary embodiments.

A sensor 105 may include a gravity sensor for detecting a motion of the portable device 100, an illuminance sensor for detecting brightness of light, a proximity sensor for detecting a degree of proximity of a human being, a motion sensor for detecting a motion of a human being, and the like.

A global positioning service (GPS) receiver 106 receives GPS signals from artificial satellites. Various services may be provided to the user by using the GPS signals.

The I/O interface 110 provides an interface between the portable device 100 and an external device or a human being, and the I/O interface 110 may include a button, a microphone, a speaker, a vibration motor, a connector, a keypad, and the like.

The display 115 may include a touch screen controller 117 and a touch screen 118.

The touch screen 118 receives a touch input of the user. The touch input is detected by various gestures such as a pinch, a spread, a drag, and a tap. A display panel of the touch screen 118 may be implemented by various types of displays such as a liquid crystal display (LCD), an OLED display, an active-matrix OLED (AM-OLED) display, and a plasma display panel (PDP). The display panel may be implemented to be flexible, transparent, or wearable.

The touch screen controller 117 transmits a touch input through the touch screen 118 to the controller 150.

According to an exemplary embodiment, the display 115 may output a UI for inquiring about whether to continuously reproduce content, which is being reproduced by the content reproducing device 200, by using the portable device 100 or a UI for inquiring about whether to continuously reproduce content, which is being reproduced by the portable device 100, by using the content reproducing device 200.

A power supply 119 includes an interface for connecting to a battery and/or an external power source for supplying power needed for the portable device 100.

The memory 160 may store an operating system (OS), various types of programs (e.g., applications), and data to be used to operate the portable device 100 and may include at least one of an internal memory and an external memory.

The internal memory may include at least one of volatile memories (e.g., dynamic random access memory (DRAM), static RAM (SRAM, and synchronous DRAM (SDRAM)), nonvolatile memories (e.g., one time programmable read-only memory (OTPROM), PROM, erasable and programmable ROM (EPROM), electrically EPROM (EEPROM), mask ROM, and flash ROM), a hard disk drive (HDD), and a solid state drive (SSD). The controller 150 may load a command or data received from at least one of the nonvolatile memories or other components on a volatile memory and process the loaded command or data. In addition, the controller 150 may store data received from another component or generated data in a nonvolatile memory. The external memory may include at least one of, for example, a compact flash (CF) memory, a secure digital (SD) memory, a micro-SD memory, a mini-SD memory, an extreme digital (xD) memory, and a memory stick.

The programs (e.g., applications) stored in the memory 160 may be classified into a plurality of modules according to functions thereof, for example, a mobile communication module 161, a Wi-Fi module 162, a Bluetooth module 163, a DMB module 164, a camera module 165, a sensor module 166, a GPS module 167, a content continuous play notification module 168, a video reproduction module 169, an audio reproduction module 170, and a database 171.

The modules include instructions for performing various functions provided by the portable device 100, respectively, and the functions of the modules could be intuitively deduced by those of ordinary skill in the art from the names thereof, and thus, only a content continuous play notification module 168 according to an exemplary embodiment will now be described.

According to an exemplary embodiment, the content continuous play notification module 168 includes at least one of instructions for outputting, through the display 115, a notification for inquiring the user about whether to continuously reproduce content, which is being reproduced by the content reproducing device 200, by using the portable device 100 or whether to continuously reproduce content, which is being reproduced by the portable device 100, by using the content reproducing device 200 if a degree of proximity between the portable device 100 and the content reproducing device 200 satisfies the predefined condition.

The controller 150 may control the components shown in FIG. 3B and provide various services to the user, by executing the programs (e.g., applications) stored in the memory 160. The controller 150 may include a RAM, a ROM, and a central processing unit (CPU). The RAM, the ROM, the CPU, and a graphic processing unit (GPU) may be connected to each other via a bus. The CPU may access the memory 160 and performs booting by using the OS stored in the memory 160. In addition, the CPU performs various functions by using the various types of program, content, data, and the like stored in the memory 160. The ROM stores a command set and the like for system booting. For example, when power is supplied to the portable device 100, the CPU may copy the OS stored in the memory 160 to the RAM according to instructions stored in the ROM and execute the OS to boot the system. If the booting is completed, the CPU may copy various programs stored in the memory 160 to the RAM and execute the copied programs to perform various operations.

The present exemplary embodiment described above may be applied to any integrated circuits including a signal processor set to perform the operations described above. In addition, the concept of the present exemplary embodiment may be any wireless communication units. In addition, for example, the concept of the present exemplary embodiment may be employed by stand-alone devices such as an application-specific integrated circuit (ASIC), a microcontroller and/or other lower system elements.

Figure 4A:
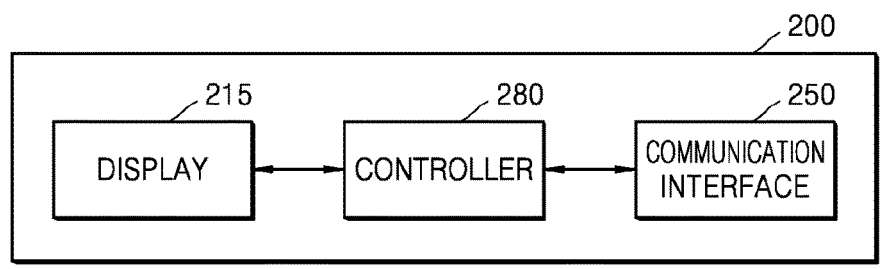
FIG. 4A illustrates a block diagram of the content reproducing device according to an exemplary embodiment.

FIG. 4A illustrates a block diagram of the content reproducing device 200 according to an exemplary embodiment.

Referring to FIG. 4A, the content reproducing device 200 may include a controller 280, a communication interface 250, and a display 215.

The display 215 outputs a screen image provided by the controller 280.

According to an exemplary embodiment, the display 215 may reproduce content being reproduced by the portable device 100 according to a user response for selecting continuous play of the content being reproduced by the portable device 100.

The communication interface 250 may receive a broadcast signal from the outside or communicate with the server 60 and the portable device 100.

According to an exemplary embodiment, the communication interface 250 may transmit a signal including information about content being reproduced by the content reproducing device 200 and signal strength information to the portable device 100 by using at least one of Wi-Fi, Bluetooth, and BLE.

According to an exemplary embodiment, the communication interface 250 may transmit a signal including information about content being reproduced by the content reproducing device 200 and signal strength information to the portable device 100 and also to one or more surrounding electronic devices by using at least one of Wi-Fi, Bluetooth, and BLE.

According to an exemplary embodiment, the communication interface 250 may periodically receive a signal including information about content being reproduced by the portable device 100 and signal strength information from the portable device 100 located around the content reproducing device 200 by using at least one of Wi-Fi, Bluetooth, and BLE.

According to an exemplary embodiment, the communication interface 250 may periodically receive a signal including information about content being reproduced by a corresponding content reproducing device and signal strength information from the portable device 100 and also from one or more electronic devices located around the content reproducing device 200 by using at least one of Wi-Fi, Bluetooth, and BLE.

The controller 280 controls a plurality of components including the display 215 and the communication interface 250 of the content reproducing device 200. The controller 280 may include a RAM, which stores a signal or data input from the outside of the content reproducing device 200 or is used as a storage region corresponding to various tasks performed by the content reproducing device 200, a ROM in which a control program for controlling peripheral devices is stored, and a processor. The processor may be implemented by an SoC in which a core and a GPU are integrated. In addition, the processor may include a plurality of processors.

According to an exemplary embodiment, the controller 280 may control the communication interface 250 to transmit information about content being reproduced by the content reproducing device 200 and signal strength information to the portable device 100 and one or more electronic devices located around the content reproducing device 200.

According to an exemplary embodiment, the controller 280 may control the communication interface 250 to receive information about content being reproduced by the portable device 100 and signal strength information from the portable device 100.

According to an exemplary embodiment, the controller 280 may control the display 215 to access and reproduce the content being reproduced by the portable device 100 when a signal including a command of reproducing the content being reproduced by the portable device 100 is received from the portable device 100.

According to an exemplary embodiment, the controller 280 may change the content reproducing device 200 from the standby mode to a normal mode when a signal including a command of waking up the content reproducing device 200 in the standby mode is received from the portable device 100.

Figure 4B:
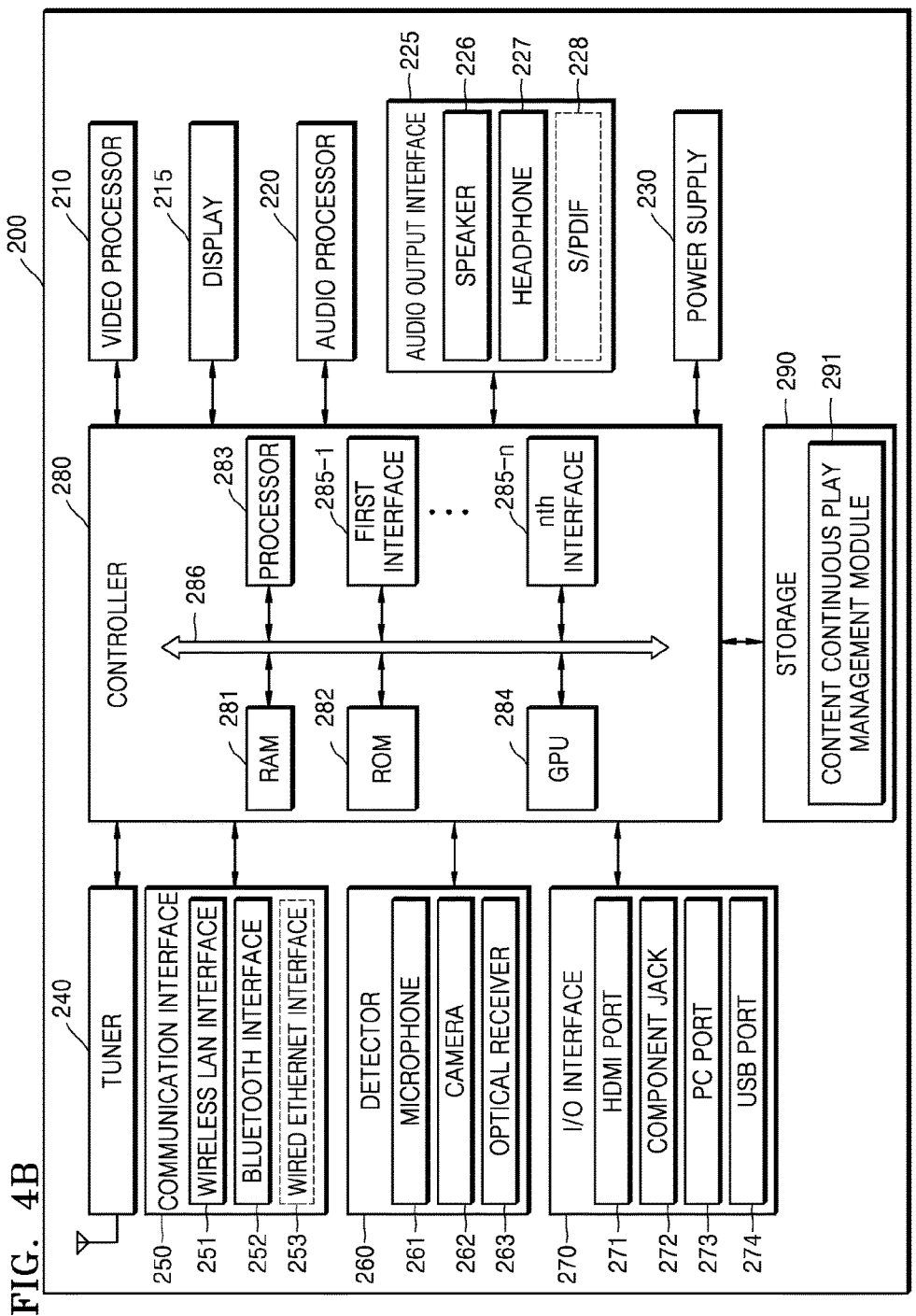
FIG. 4B illustrates a detailed block diagram of the content reproducing device of FIG. 4A.

FIG. 4B illustrates a detailed block diagram of the content reproducing device 200 of FIG. 4A.

FIG. 4B illustrates a particular configuration diagram of the content reproducing device 200 of FIG. 4A.

Referring to FIG. 4B, the content reproducing device 200 may include a video processor 210, the display 215, an audio processor 220, an audio output interface 225, a power supply 230, a tuner 240, the communication interface 250, a detector 260, an input/output (I/O) interface 270, the controller 280, and a storage 290.

The video processor 210 processes video data received by the content reproducing device 200. The video processor 210 may perform various types of image processing, such as decoding, scaling, noise filtering, frame rate conversion, and resolution conversion, on the video data.

The display 215 displays video included in a broadcast signal received through the tuner 240 on a screen under control of the controller 280. In addition, the display 215 may display content (e.g., video) input through the communication interface 250 or the I/O interface 270. The display 215 may display an image stored in the storage 290 under control of the controller 280. In addition, the display 215 may display a voice UI (e.g., including a voice command guide) for performing a voice recognition task corresponding to voice recognition or a motion UI (e.g., including a user motion guide for motion recognition) for performing a motion recognition task corresponding to motion recognition.

According to an exemplary embodiment, the display 215 may output a UI for inquiring about whether to continuous reproduce content being reproduced by the portable device 100, under control of the controller 280.

According to an exemplary embodiment, the display 215 may output content accessed by referring to content information received from the portable device 100 if an input for selecting continuous play is received from the user in response to the UI for inquiring about whether to continuous reproduce the content being reproduced by the portable device 100.

The audio processor 220 processes audio data. The audio processor 220 may perform various types of processing, such as decoding, amplification, and noise filtering, on the audio data. The audio processor 220 may include a plurality of audio processing modules for processing audio corresponding to a plurality of pieces of content.

The audio output interface 225 outputs audio included in a broadcast signal received through the tuner 240, under control of the controller 280. The audio output interface 225 may output audio (e.g., a voice or sound) input through the communication interface 250 or the I/O interface 270. In addition, the audio output interface 225 may output audio stored in the storage 290, under control of the controller 280. The audio output interface 225 may include at least one of a speaker 226, a headphone output terminal 227, and a Sony/Philips digital interface (S/PDIF) output terminal 228. The audio output interface 225 may include a combination of the speaker 226, the headphone output terminal 227, and the S/PDIF output terminal 228.

According to an exemplary embodiment, content for which the user desires continuous play may include audio data, and the audio output interface 225 may continuously output audio data being reproduced by the portable device 100, under control of the controller 280.

The power supply 230 supplies power input from an external power source to the internal components 210 to 290 of the content reproducing device 200, under control of the controller 280. Alternatively, the power supply 230 may supply power input from one or more batteries located inside the content reproducing device 200 to the internal components 210 to 290, under control of the controller 280.

According to an exemplary embodiment, the power supply 230 may supply power to at least a portion of the communication interface 250 to receive a signal including information about content being reproduced by the portable device 100 and signal strength information from the portable device 100 in a state in which the content reproducing device 200 is in the standby mode.

According to an exemplary embodiment, the power supply 230 may supply power to each component of the content reproducing device 200 under control of the controller 280 when the communication interface 250 receives a signal including a command of waking up the content reproducing device 200 in the standby mode from the portable device 100.

The tuner 240 may process a broadcast signal received in a wired or wireless manner through amplification, mixing, resonance, and the like. The tuner 240 may be tuned to a frequency of a channel which the content reproducing device 200 desires to receive from among a number of received frequency components. The broadcast signal includes audio, video and additional information (e.g., electronic program guide (EPG)).

The tuner 240 may receive a broadcast signal in a frequency band corresponding to a channel number (e.g., cable station number 506) according to a user input (e.g., a control signal received from a control device, examples of the control signal are a channel number input, a channel up-down input, and a channel input on an EPG screen image).

The tuner 240 may receive broadcast signals from various sources such as terrestrial broadcasting stations, cable broadcasting stations, satellite broadcasting stations, Internet broadcasting stations, and the like. The tuner 240 may receive broadcast signals from sources such as analog broadcasting stations, digital broadcasting stations. A broadcast signal received through the tuner 240 is decoded (e.g., audio decoding, video decoding, or additional information decoding) and separated into audio, video, and/or additional information. The separated audio, video, and/or additional information may be stored in the storage 290 under control of the controller 280.

The tuner 240 of the content reproducing device 200 may be single or plural in number. The tuner 240 may be implemented as all-in-one with the content reproducing device 200 or implemented as a separate device (e.g., a set-top box having a tuner) electrically connected to the content reproducing device 200 or as a tuner connected to the I/O interface 270.

The communication interface 250 may connect the content reproducing device 200 to an external device (e.g., an audio device) under control of the controller 280. The controller 280 may transmit/receive content to/from an external device connected through the communication interface 250, download an application from the external device, or performs web browsing through the communication interface 250. The communication interface 250 may include one of a wireless LAN interface 251, a Bluetooth interface 252, and a wired Ethernet interface 253 in correspondence with the performance and structure of the content reproducing device 200. Alternatively, the communication interface 250 may include a combination of the wireless LAN interface 251, the Bluetooth interface 252, and the wired Ethernet interface 253. The communication interface 250 may receive a control signal of a control device under control of the controller 280. The control signal may be implemented as a Bluetooth-type signal, a radio frequency (RF) type signal, or a Wi-Fi type signal.

The communication interface 250 may further include other short-distance communication interfaces (e.g., an NFC interface and a BLE interface) besides the Bluetooth interface 252.

According to an exemplary embodiment, the communication interface 250 may transmit a signal including information about content being reproduced by the content reproducing device 200 and signal strength information to at least one surrounding devices including the portable device 100.

According to an exemplary embodiment, the communication interface 250 may receive a signal including information about content being reproduced by the portable device 100 and signal strength information from the portable device 100.

In this case, the communication interface 250 may use at least one of Bluetooth, Wi-Fi, BLE, laser beam communication, and infrared communication.

The detector 260 detects a voice of the user, an image of the user, or an interaction of the user.

A microphone 261 receives a voice uttered by the user. The microphone 261 may convert the received voice into an electrical signal and output the converted electrical signal to the controller 280. The user's voice may include, for example, a voice corresponding to a menu or function of the content reproducing device 200. A recognition range of the microphone 261 is recommended to be within 4 m from the microphone 261 to a user's location. The recognition range of the microphone 261 may vary in correspondence with a volume of the user's voice and an ambient environment (e.g., a speaker sound, and ambient noise).

The microphone 261 may be implemented by being integrated with or separated from the content reproducing device 200. The separated microphone 261 may be electrically connected to the content reproducing device 200 through the communication interface 250 or the I/O interface 270.

It will be easily understood to those of ordinary skill in the art that the microphone 261 may be omitted according to the performance and structure of the content reproducing device 200.

A camera 262 receives an image (e.g., continuous frames) corresponding to a user's motion including a gesture within a camera recognition range. For example, the recognition range of the camera 262 may be a distance within 0.1 m to 5 m from the camera 262 to the user. The user's motion may include, for example, a motion of a portion of the body of the user, such as face, expression, hand, fist, or finger, or a partial motion of the user. The camera 262 may convert the received image into an electrical signal and output the converted electrical signal to the controller 280, under control of the controller 280.

The controller 280 may select a menu displayed on the content reproducing device 200 by using a recognition result of the received motion or perform a control corresponding to the motion recognition result. For example, the control may include channel adjustment, volume adjustment, or movement of an indicator.

The camera 262 may include a lens and an image sensor. The camera 262 may support optical zoom or digital zoom by using a plurality of lenses and image processing. The recognition range of the camera 262 may be variously set according to an angle of the camera 262 and an ambient environment condition. When the camera 262 includes a plurality of cameras, a 3D still image or a 3D motion may be received using the plurality of cameras.

The camera 262 may be implemented by being integrated with or separated from the content reproducing device 200. A separate device including the separated camera 262 may be electrically connected to the content reproducing device 200 through the communication interface 250 or the I/O interface 270.

It will be easily understood to those of ordinary skill in the art that the camera 262 may be omitted according to the performance and structure of the content reproducing device 200.

An optical receiver 263 receives an optical signal (including a control signal) received from an external control device through an optical window or the like of a bezel of the display 215. The optical receiver 263 may receive an optical signal corresponding to a user input (e.g., a touch, a push, a touch gesture, a voice, or a motion) from the control device. The control signal may be extracted from the received optical signal under control of the controller 280.

The I/O interface 270 receives video (e.g., a moving picture), audio (e.g., a voice or music), and additional information (e.g., an EPG), and the like from the outside of the content reproducing device 200. The I/O interface 270 may include one of a high definition multimedia interface (HDMI) port 271, a component jack 272, a PC port 273, and a USB port 274. The I/O interface 270 may include a combination of the HDMI port 271, the component jack 272, the PC port 273, and the USB port 274.

It will be easily understood to those of ordinary skill in the art that a configuration and operation of the I/O interface 270 may be variously implemented according to exemplary embodiments.

The controller 280 controls a general operation of the content reproducing device 200 and a signal flow between the internal components 210 to 290 of the content reproducing device 200 and processes data. If an input of the user exists, or a previously set and stored condition is satisfied, the controller 280 may execute an OS and various applications stored in the storage 290.

The controller 280 may include a RAM 281 used to store a signal or data input from the outside of the content reproducing device 200 or used as a storage region corresponding to various operations performed by the content reproducing device 200, a ROM 282 in which a control program for controlling the content reproducing device 200 is stored, and a processor 283.

The processor 283 may include a GPU for processing graphics corresponding to video. The processor 283 may be implemented by an SoC in which a core and a GPU are integrated. In addition, the processor 283 may include a plurality of processors.

A GPU 284 generates a screen image including various objects, such as an icon, an image, and a text, by using a computation unit and a renderer.

First to nth interfaces 285-1 to 285-n are connected to the various components described above. One of the first to nth interfaces 285-1 to 285-n may be a network interface connected to an external device via a network.

The RAM 281, the ROM 282, the processor 283, the GPU 284, and the first to nth interfaces 285-1 to 285-n may be connected to each other via an internal bus 286.

In the present exemplary embodiment, the term "controller of a content reproducing device" includes the processor 283, the ROM 282, and the RAM 281.

According to an exemplary embodiment, the controller 280 may execute a content continuous play management module 291 stored in the storage 290 to continuously stream content to the portable device 100 from the content reproducing device 200, and vice versa. That is, the controller 280 may control the portable device 100 to continuously reproduce content being reproduced by the content reproducing device 200 or control the content reproducing device 200 to continuously reproduce content being reproduced by the portable device 100, by using the content continuous play management module 291.

According to an exemplary embodiment, the controller 280 may monitor content being reproduced on the display 215 or content output from the audio output interface 225 and control the communication interface 250 to transmit a signal including information about the monitored content and signal strength information to the portable device 100, by using the content continuous play management module 291.

According to an exemplary embodiment, the controller 280 may control the communication interface 250 to receive a signal including information about content being reproduced by the portable device 100 and signal strength information from the portable device 100, by using the content continuous play management module 291.

According to an exemplary embodiment, the controller 280 may control the display 215 to output a UI for inquiring about whether to continuous reproduce the content being reproduced by the portable device 100 by using the content reproducing device 200 if it is determined that a degree of proximity between the portable device 100 and the content reproducing device 200 satisfies the predefined condition based on the signal strength information received from the portable device 100, by using the content continuous play management module 291.

According to an exemplary embodiment, the controller 280 may control at least one of the tuner 240, the communication interface 250, the I/O interface 270, the display 215, and the audio output interface 225 to access the content being reproduced by the portable device 100 and output the content if a user input of selecting continuous play of content in response to the UI described above.

It will be easily understood to those of ordinary skill in the art that a configuration and operation of the controller 280 may be variously implemented according to exemplary embodiments.

The storage 290 may store various data, programs, or applications for operating and controlling the content reproducing device 200 under control of the controller 280. The storage 290 may store signals or data input/output in correspondence with operations of the video processor 210, the display 215, the audio processor 220, the audio output interface 225, the power supply 230, the tuner 240, the communication interface 250, the detector 260, and the I/O interface 270. The storage 290 may store control programs for controlling the content reproducing device 200 and the controller 280, applications initially provided from a manufacturer or downloaded from the outside, graphic user interfaces (GUIs) related to the applications, objects (e.g., image text, icons, and buttons) for providing the GUIs, user information, documents, databases (DBs), or related data.

According to an exemplary embodiment, the term "storage" includes the storage 290, the ROM 282 of the controller 280, the RAM 281 of the controller 280, or a memory card (e.g., a micro SD card or a USB memory) mounted in the content reproducing device 200. In addition, the storage 290 may include a nonvolatile memory, a volatile memory, an HDD, or an SSD.

The storage 290 may include a broadcast reception module, a channel control module, a volume control module, a communication control module, a voice recognition module, a motion recognition module, an optical reception module, a display control module, an audio control module, an external input control module, a power control module, a power control module for an external device connected in a wireless manner (e.g., Bluetooth), a voice DB, or a motion DB. The controller 280 may perform each function by using the above-described software modules stored in the storage 290.

Each of the modules includes instructions for performing various functions provided by the content reproducing device 200, and functions of the modules may be intuitively deduced by those of ordinary skill in the art from names thereof.

According to an exemplary embodiment, the storage 290 may include the content continuous play management module 291.

The content continuous play management module 291 may include one or more instructions for monitoring content being reproduced by the content reproducing device 200 and transmitting a signal including information about the content being reproduced and signal strength information via the communication interface 250.

In addition, the content continuous play management module 291 may include one or more instructions for receiving a signal including content being reproduced by the portable device 100 and signal strength information from the portable device 100 via the communication interface 250.

In addition, the content continuous play management module 291 may include one or more instructions for outputting, through the display 215, a UI for inquiring about whether to continuously reproduce the content being reproduced by the portable device 100 if it is determined that a degree of proximity between the portable device 100 and the content reproducing device 200 satisfies the predefined condition according to the signal strength information received from the portable device 100.

In addition, the content continuous play management module 291 may include one or more instructions for accessing the content being reproduced by the portable device 100 and reproducing the accessed content.

At least one component may be added to or omitted from the components (e.g., 210 to 290) shown in the content reproducing device 200 of FIG. 4B according to the performance of the content reproducing device 200. In addition, it will be easily understood to those of ordinary skill in the art that locations of the components (e.g., 210 to 290) may be modified according to the performance or structure of the content reproducing device 200.

Figure 5:
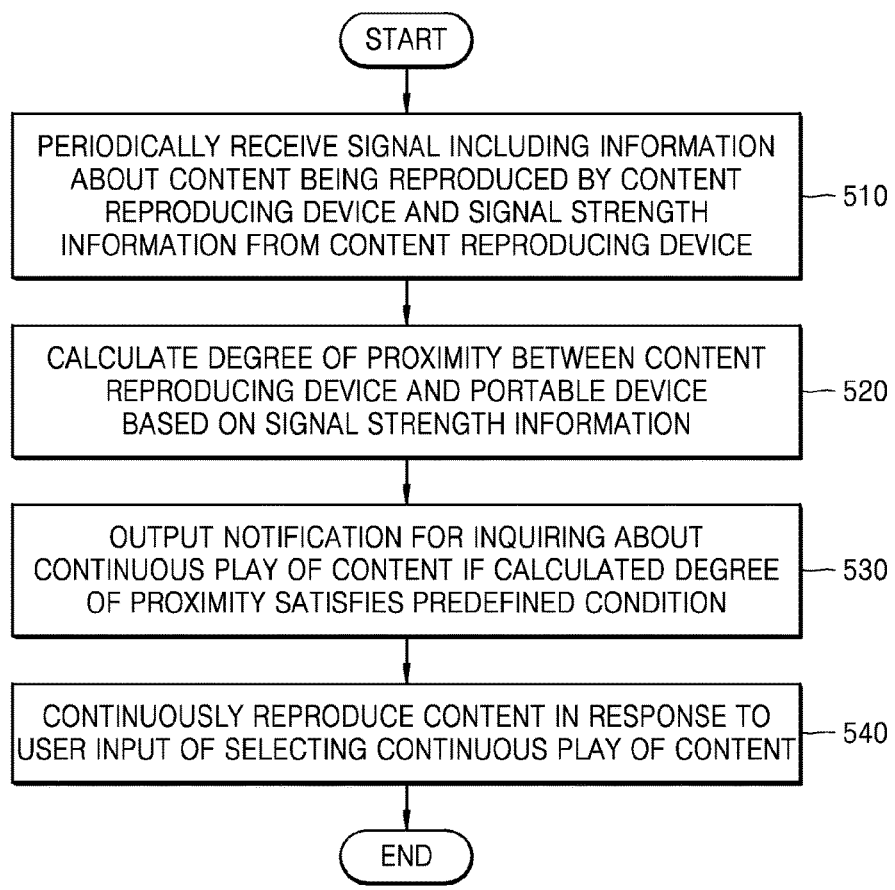
FIG. 5 illustrates a flowchart of an operation of continuously reproducing content, which is being reproduced by the content reproducing device, by using the portable device, according to an exemplary embodiment.

FIG. 5 illustrates a flowchart of an operation of continuously reproducing content, which is being reproduced by the content reproducing device 200, by using the portable device 100, according to an exemplary embodiment.

Referring to FIG. 5, in operation 510, the portable device 100 periodically receives a signal including information about content being reproduced by the content reproducing device 200 and signal strength information from the content reproducing device 200.

The content reproducing device 200 may transmit a signal including information about content being reproduced by the content reproducing device 200 and signal strength information to the portable device 100 while continuously monitoring the content being reproduced, and the portable device 100 may periodically receive the signal.

The content reproducing device 200 may periodically transmit a signal including information about content and signal strength information to the portable device 100 by using a Bluetooth beacon.

Classic Bluetooth is a wireless technology standard used to exchange data or a voice within a short distance. This technology is widely used to transmit data, audio, and video between devices, such as a smartphone, a laptop PC, a PC peripheral device, and earphones. However, since this Bluetooth technology consumes a much current, the Bluetooth technology is not suitable for battery-based applications oriented to a long-time operation without exchanging or recharging a battery. BLE technology operates in the same spectrum as the classic Bluetooth technology but uses a different channel from that of the classic Bluetooth technology. Instead of 79 channels having a bandwidth of 1 MHz in the Bluetooth technology, the BLE technology uses 40 channels having a bandwidth of 2 MHz and solves a narrow band interference problem by using a frequency hopping scheme. By using BLE, ultra-low power connectivity and basic data transmission may be performed even for an application which was difficult to perform due to power consumption. BLE may consume power consumption of a very low level, thereby realizing a pure sense of low-power consumption. A device employing the BLE technology consumes low power enough to operate for several months to several years with one normal coin cell battery, and thus, the BLE technology may be effectively used for the content reproducing device 200 to always operate in the standby mode or the normal mode. For example, when the content reproducing device 200 is in the normal mode, the content reproducing device 200 may periodically transmit a signal including information about content being reproduced by the content reproducing device 200. In addition, for example, when the content reproducing device 200 is in the standby mode, the content reproducing device 200 may periodically transmit a signal including information indicating that the content reproducing device 200 is in the standby mode or periodically receive a signal including content information from an external device (e.g., a portable device).

Therefore, the content reproducing device 200 may extract information about content being reproduced by the content reproducing device 200 while reproducing the content and transmit the information about the content to a Bluetooth module, and the Bluetooth module may periodically transmit information about content and signal strength information to the portable device 100.

Examples of a signal received by the portable device 100 from the content reproducing device 200 are described with reference to FIGS. 6A and 6B.

Figure 6A:
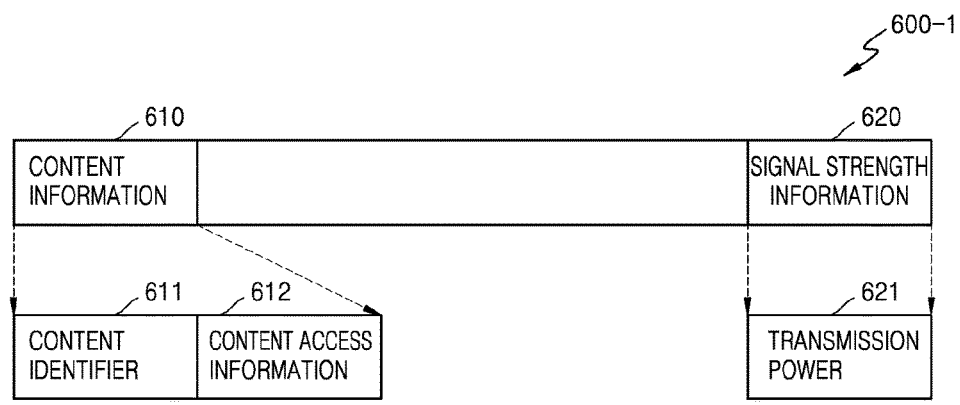
FIG. 6A illustrates a signal received by the portable device from the content reproducing device, according to an exemplary embodiment.

FIG. 6A illustrates a signal 600-1 received by the portable device 100 from the content reproducing device 200, according to an exemplary embodiment.

Referring to FIG. 6A, the signal 600-1 includes content information 610 and signal strength information 620.

The content information 610 includes a content identifier 611 by which content is identifiable, such as a serial number of a name of content being reproduced by the content reproducing device 200, and content access information 612 to be used to access the content.

The content identifier 611 may be represented by a program identification (ID) or the like. For example, when the content is terrestrial or cable TV content, the content is received as a transport stream (TS) packet, and the TS packet includes an EPG including broadcast program information, and the like. The broadcast program information included in the EPG may include a broadcast program identifier, broadcast program time information, and the like. As another example, when the content is IPTV content or a signal received through a VOD service, a content provision server may transmit program information including a program ID, time information, and the like. Therefore, the content reproducing device 200 may extract the program ID from the program information received from the content provision server and provide the content identifier 611 to the signal 600-1 by using the extracted program ID.

The content access information 612 is information used to access content and may be location information of content, such as a uniform resource locator (URL), an identifier of a content provision server for providing content, or an identifier of a content provision application for providing content. Examples of the content provision application are Netflix™, Tving™, and Amazon™.

For example, the content information 610 may include "The Lord of the Rings" as the content identifier 611 and "Netflix" as the content access information 612.

According to another exemplary embodiment, the content information 610 may include digital media fingerprints extracted from original content (e.g., audio or video file) by using a fingerprinting algorithm. The fingerprinting algorithm may generate the fingerprints based on at least one of a plurality of properties of the original content (e.g., brightness level of certain pixels, object movements, camera cuts, etc.) and store them in database repository. The fingerprints may represent unique characteristics of the content and therefore may allow the portable device 100 to identify the original content upon comparison between the fingerprints in the content information 610 and the fingerprints in the data repository. Once the portable device 100 identifies the content which has been played by the reproducing device 200, the portable device 100 may request a content providing sever to stream the content to the portable device 100.

The signal strength information 620 includes transmission power (TxPower) 621 of the content reproducing device 200. The TxPower 621 indicates a strength of a signal generated by the content reproducing device 200 while the content reproducing device 200 is transmitting the signal 600-1. A transmission power level is represented using a decibel-milliwatts (dBm) unit, and a transmission power level in Bluetooth communication has a range of −100 dBm to +20 dBm. According to another exemplary embodiment, the signal strength information 620 may be omitted from the signal 600-1 and the portable device 100 may measure a ratio of signal power to noise power (i.e., signal-to-noise ratio) of the signal 600-1 received from the content reproducing device 200. The portable device 100 may compare the signal-to-noise ratio of the signal 600-1 to a predetermined value. The portable device 100 may determine that it is located out of the watchable range of the content reproducing device 200 when the signal-to-noise ratio is less than the predetermined value.

Figure 6B:
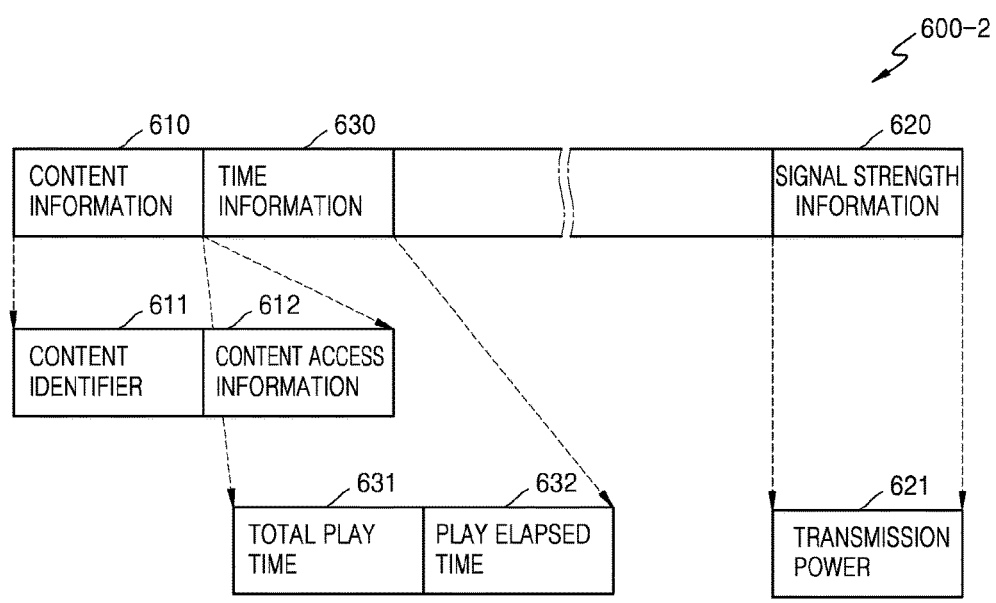
FIG. 6B illustrates a signal received by the portable device from the content reproducing device, according to another exemplary embodiment.

FIG. 6B illustrates a signal 600-2 received by the portable device 100 from the content reproducing device 200, according to another exemplary embodiment.

Referring to FIG. 6B, the signal 600-2 includes the same content information 610 and signal strength information 620 as the signal 600-1 and further includes time information 630.

The time information 630 is time information related to content being reproduced by the content reproducing device 200 and includes a total play time 631 and a play elapsed time 632 of content. The total play time 631 of content indicates a time to be taken to fully reproduce the content, and the play elapsed time 632 indicates an elapsed time from a content play start time point to a current time point. The portable device 100 may detect in real-time how much the user has replayed and watched content at a current time point, by using the play elapsed time 632.

Referring back to FIG. 5, in operation 520, the portable device 100 calculates a degree of proximity between the content reproducing device 200 and the portable device 100 based on the received signal strength information.

The portable device 100 may calculate the degree of proximity between the content reproducing device 200 and the portable device 100 based on the signal strength information 620 included in the signal 600-1 received from the content reproducing device 200.

An received signal strength indicator (RSSI) is an index of a power level of a signal received by an antenna of the portable device 100. The higher the RSSI, the stronger the signal. Therefore, the portable device 100 may determine the degree of proximity between the content reproducing device 200 and the portable device 100 by using the signal strength information 620 included in the signal 600-1 received from the content reproducing device 200 and an RSSI measured when the portable device 100 receives the signal 600-1 from the content reproducing device 200. For example, when the TxPower 621 as the signal strength information 620 included in the signal 600-1 is 10 dBm and an RSSI measured when the portable device 100 receives the signal 600-1 is −65 dBm, the portable device 100 may calculate a distance between the content reproducing device 200 and the portable device 100 based on the TxPower 621 and the measured RSSI.

In operation 530, the portable device 100 outputs, through the display 115, a notification for inquiring about continuous play of content if the calculated degree of proximity satisfies the predefined condition.

If the portable device 100 determines that the user moves out of a watchable range from the content reproducing device 200 since the calculated degree of proximity is lower than a predefined threshold value, the portable device 100 may output, through the display 115, a notification for inquiring about whether to continuously reproduce content, which is being reproduced by the content reproducing device 200, by using the portable device 100.

Figure 7:
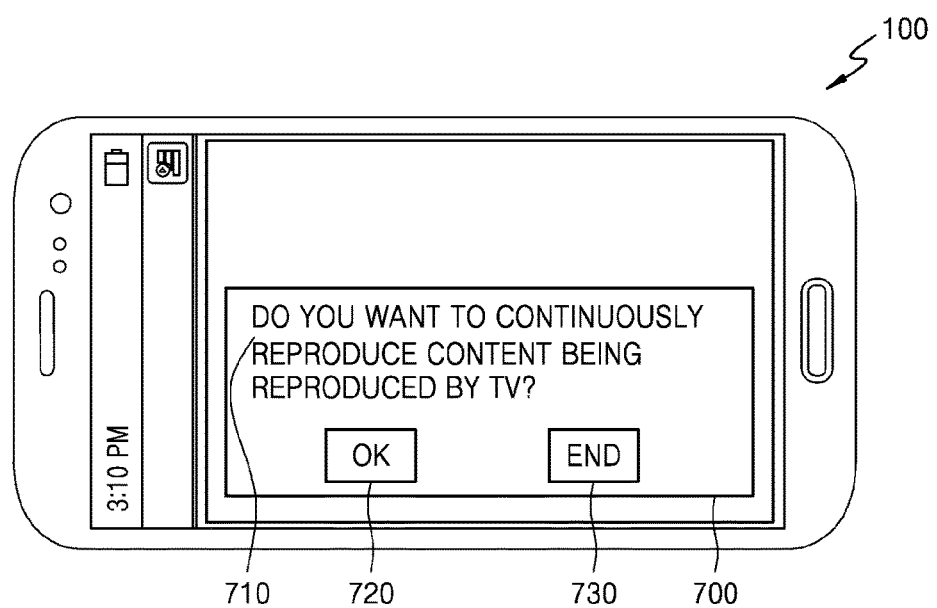
FIG. 7 illustrates a user interface (UI) for inquiring about continuous play of content, which is output by the portable device through a display, according to an exemplary embodiment.

FIG. 7 illustrates a UI 700 for inquiring about continuous play of content, which is output by the portable device 100 through the display 115, according to an exemplary embodiment.

Referring to FIG. 7, the UI 700 includes a message "do you want to continuously reproduce content being reproduced by a TV?" 710, an item "OK" 720 for selecting continuous play of content in response to this inquiry, and an item "END" 730 for ending this UI window.

Referring back to FIG. 5, in operation 540, the portable device 100 accesses and continuously reproduces the content in response to a user input of selecting continuous play of content.

For example, if the user selects the item "OK" 720 on the UI 700 shown in FIG. 7, the portable device 100 accesses the content and continuously reproduces the content by referring to content information included in a signal periodically received from the content reproducing device 200.

The signal 600-2 periodically received from the content reproducing device 200 includes the content information 610 including the content identifier 611 and the content access information 612. Therefore, the portable device 100 may access a place where content is located by using the content access information 612 and the content identifier 611. For example, if the content information 610 includes "The Lord of the Rings" as the content identifier 611 and "Netflix" as the content access information 612, the portable device 100 may access and reproduce the film "The Lord of the Rings" through an application "Netflix". In addition, since the signal 600-2 periodically received from the content reproducing device 200 includes the time information 630 including the play elapsed time 632, the portable device 100 may detect how much the user has replayed and watched the content at a current time point, by using the play elapsed time 632. Therefore, the portable device 100 may reproduce the content by continuing a reproduction point of the content reproduced till the current time point, and thus, the user may continuously watch the content which the user has watched by using the content reproducing device 200.

According to an exemplary embodiment, when the portable device 100 outputs, through the display 115, a notification for inquiring about whether to continuously reproduce content, which is being reproduced by the content reproducing device 200, by using the portable device 100, the portable device 100 may previously check information about the content being reproduced by the content reproducing device 200, and if an additional program or application is needed to reproduce the content, the portable device 100 may perform an additional operation.

Figure 8:
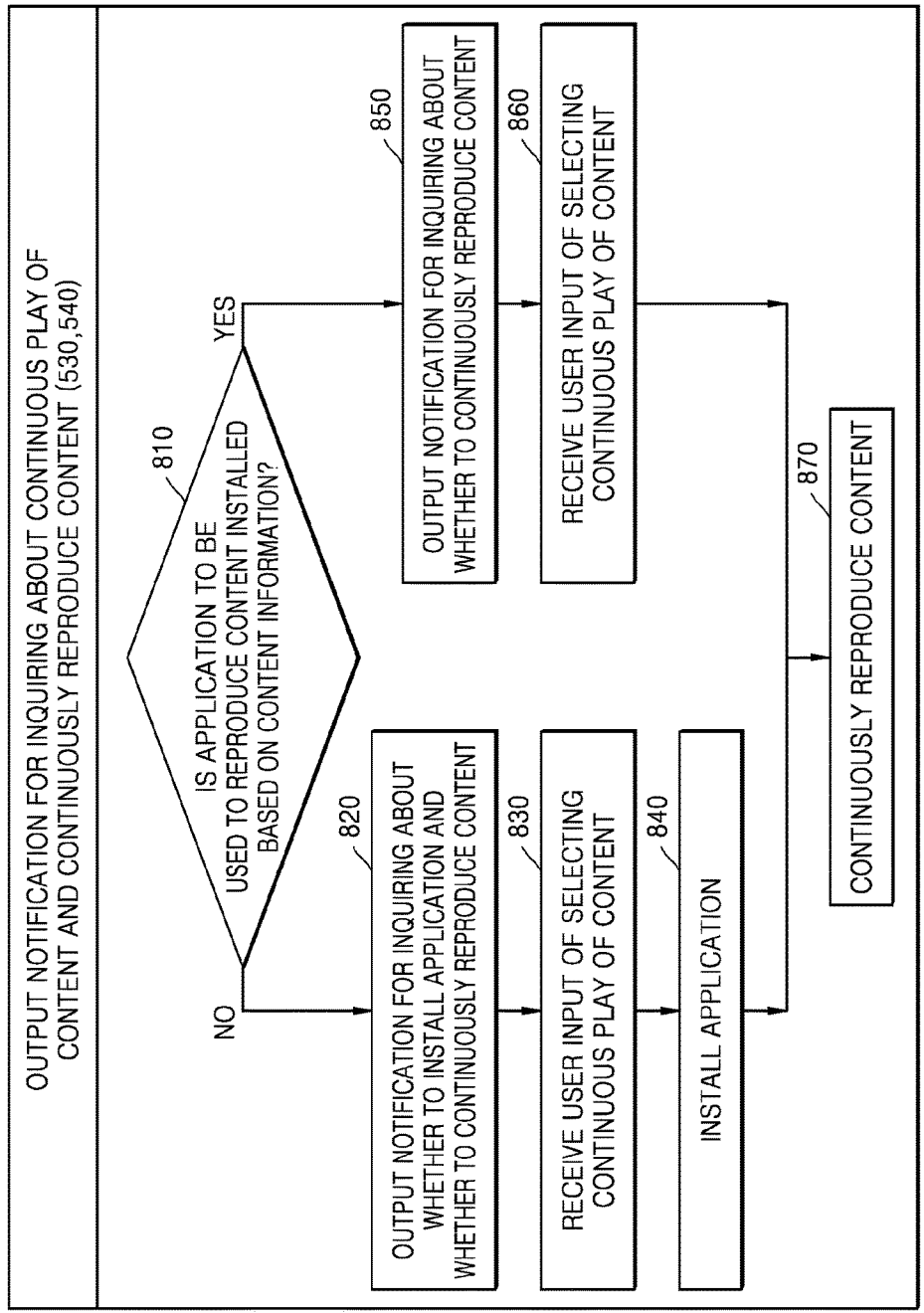
FIG. 8 illustrates a flowchart of operations 530 and 540 of FIG. 5, according to another exemplary embodiment.

FIG. 8 illustrates a flowchart of operations 530 and 540 of FIG. 5, according to another exemplary embodiment.

Referring to FIG. 8, in operation 810, the portable device 100 determines whether an application to be used for the portable device 100 to reproduce corresponding content is installed by referring to the content information 610 of a signal periodically received from the content reproducing device 200. For example, when the content information 610 includes "The Lord of the Rings" as the content identifier 611 and "Netflix" as the content access information 612, the portable device 100 determines whether a Netflix application to be used to access the film "The Lord of the Rings" is installed.

If it is determined that an application to be used to reproduce the corresponding content is installed, the portable device 100 outputs a notification for inquiring about continuous play of content in operation 850, receives a user input of selecting continuous play of content in operation 860, and accesses and continuously reproduces the corresponding content in operation 870.

Otherwise, if it is determined that an application to be used to reproduce the corresponding content is not installed, the portable device 100 outputs a notification for inquiring about whether to install the application and whether to continuously reproduce the corresponding content in operation 820.

Figure 9:
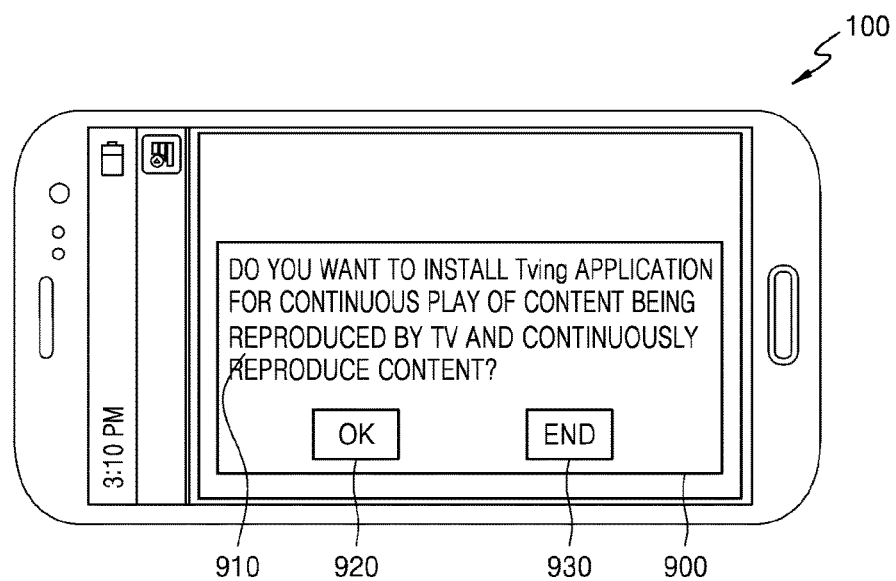
FIG. 9 illustrates a UI for inquiring about whether to install an application and whether to continuously reproduce content, according to an exemplary embodiment.

FIG. 9 illustrates a UI for inquiring about whether to install an application and whether to continuously reproduce content, according to an exemplary embodiment.

Referring to FIG. 9, a UI 900 includes a message "do you want to install a Tying application for continuous play of content being reproduced by a TV and continuously reproduce the content?" 910, an item "OK" 920 for selecting continuous play in response to this inquiry, and an item "END" 930 for ending this UI window in response to this inquiry.

Referring back to FIG. 8, if a user input of selecting continuous play of content is received in operation 830, the portable device 100 installs the application to be used for continuous play of the corresponding content in operation 840 and continuously reproduces the corresponding content by using the installed application in operation 870.

Figure 10:
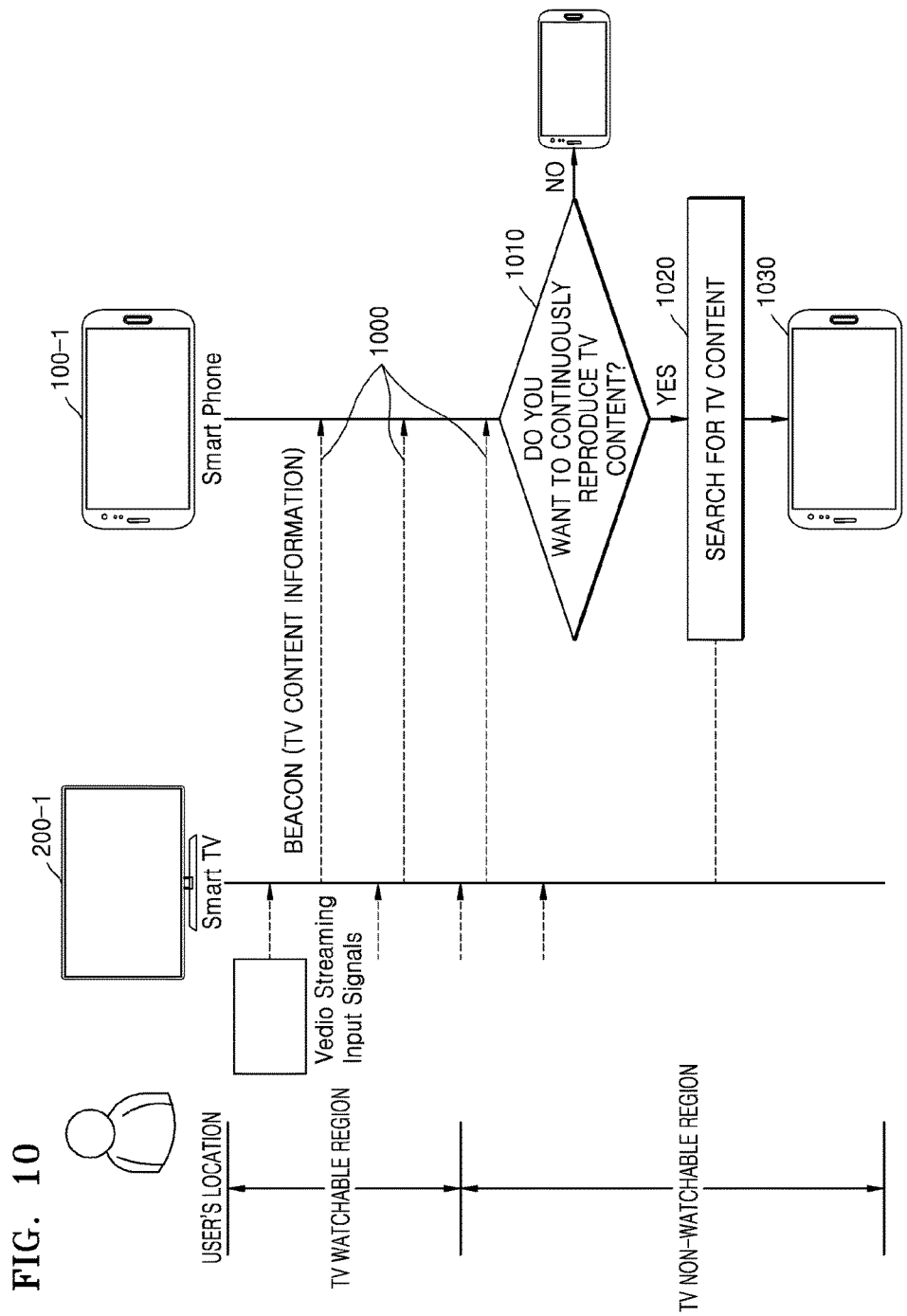
FIG. 10 illustrates a signaling diagram of signals transmitted according to the embodiment of FIG. 5.

FIG. 10 illustrates a signaling diagram of signals transmitted according to the exemplary embodiment of FIG. 5.

Referring to FIG. 10, while a user is watching content through a smart TV 200-1, a type of a content reproducing device, in a TV watchable region by holding a smartphone 100-1, a type of a portable device, the smart TV 200-1 periodically transmits a beacon 1000 including information about content being reproduced by the smart TV 200-1 to the smartphone 100-1.

The smartphone 100-1 periodically receives the beacon 1000 from the smart TV 200-1 and may determine a degree of proximity between the smartphone 100-1 and the smart TV 200-1 by using transmission power included in the beacon 1000 and a measured RSSI. Alternatively, the smartphone 100-1 may transmit a request message to the smart TV 200-1 to receive the beacon 1000.

The smartphone 100-1 may detect a real-time distance between the smartphone 100-1 and the smart TV 200-1 by using the real-time beacon 1000 received from the smart TV 200-1. If the smartphone 100-1 determines that a distance between the smartphone 100-1 and the smart TV 200-1 is greater than a predefined threshold value, the smartphone 100-1 may determine that the user moves out of the TV watchable region with holding the smartphone 100-1 and inquire the user about continuous play of TV content. That is, the smartphone 100-1 inquires about continuous play of TV content by displaying a popup window including a message "do you want to continuously reproduce TV content?" on a display in operation 1010.

According to an exemplary embodiment, the smartphone 100-1 may start performing the operations of determining the distance between the smartphone 100-1 and the smart TV 200-1 and displaying the popup window if the smartphone 100-1 is executing one of a plurality of predetermined applications (e.g., Netflix application, Hulu Application, YouTube Application, Media Player). By doing so, the smartphone 100-1 may prevent the popup window from causing an undesired interruption when the user of the smartphone 100-1 does not intend to play the content which has been reproduced by the smart TV 200-1.

If the user does not select continuous play in response to the popup window displayed on the display of the smartphone 100-1, this flow ends.

If the user selects continuous play in response to the popup window displayed on the display of the smartphone 100-1, the smartphone 100-1 searches for the content being reproduced by the smart TV 200-1 by referring to the TV content information included in the beacon 1000 periodically received from the smart TV 200-1 in operation 1020 and continuously reproduces the searched content on the display of the smartphone 100-1 in operation 1030.

Figure 11:
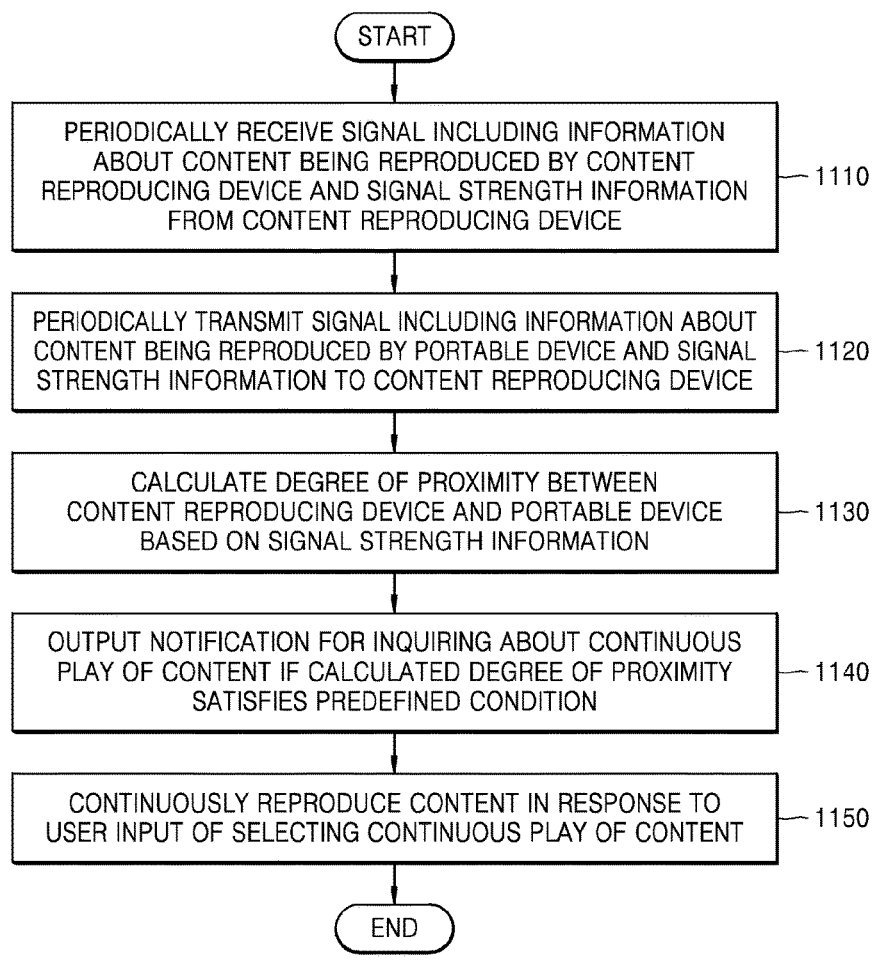
FIG. 11 illustrates a flowchart of an operation of continuously reproducing content, which is being reproduced by the content reproducing device, by using the portable device, according to another exemplary embodiment.

FIG. 11 illustrates a flowchart of an operation of continuously reproducing content, which is being reproduced by the content reproducing device 200, by using the portable device 100, according to another exemplary embodiment.

Referring to FIG. 11, in operation 1110, the portable device 100 periodically receives a signal including information about content being reproduced by the content reproducing device 200 and signal strength information from the content reproducing device 200.

Figure 12:
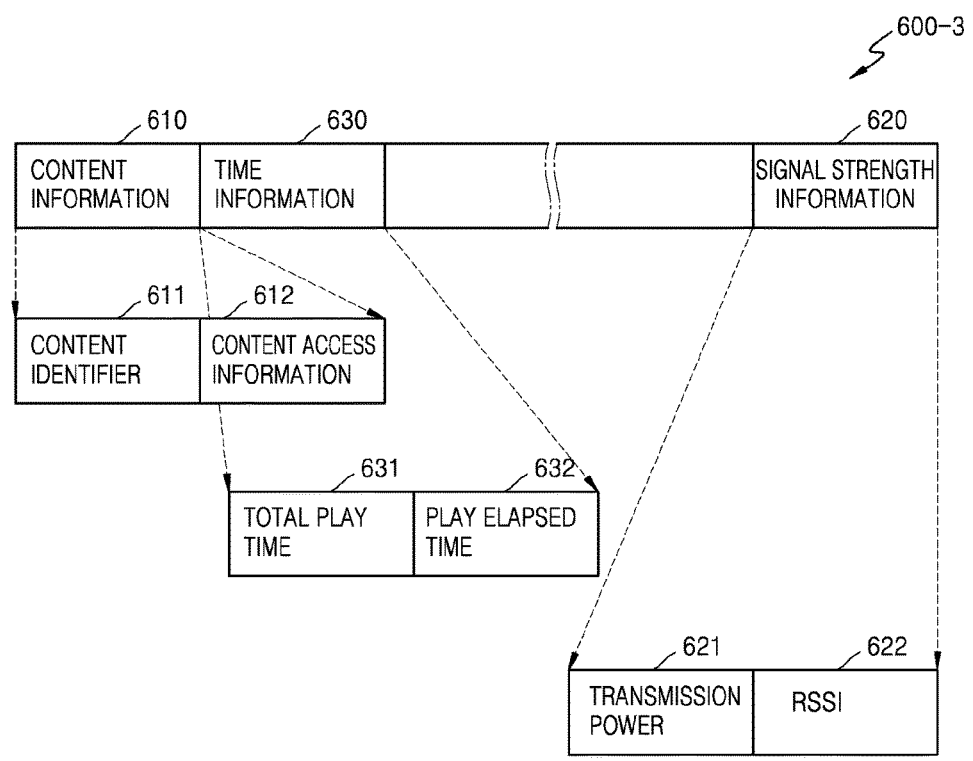
FIG. 12 illustrates a signal received by the portable device from the content reproducing device, according to another exemplary embodiment.

In this case, the portable device 100 may receive a signal of a format as shown in FIG. 6A or 6B or a signal of a format as shown in FIG. 12 from the content reproducing device 200.

FIG. 12 illustrates a signal 600-3 received by the portable device 100 from the content reproducing device 200, according to another exemplary embodiment.

Referring to FIG. 12, the signal 600-3 includes the same content information 610 and time information 630 as the signal 600-2 of FIG. 6B and further includes an RSSI 622 with the transmission power 621 in the signal strength information 620.

The RSSI 622 indicates an index of a power level of a signal received by an antenna of the portable device 100.

The content reproducing device 200 transmits both the transmission power 621 when the signal 600-3 is transmitted to the portable device 100 and the RSSI 622 measured by the content reproducing device 200.

Figure 13:
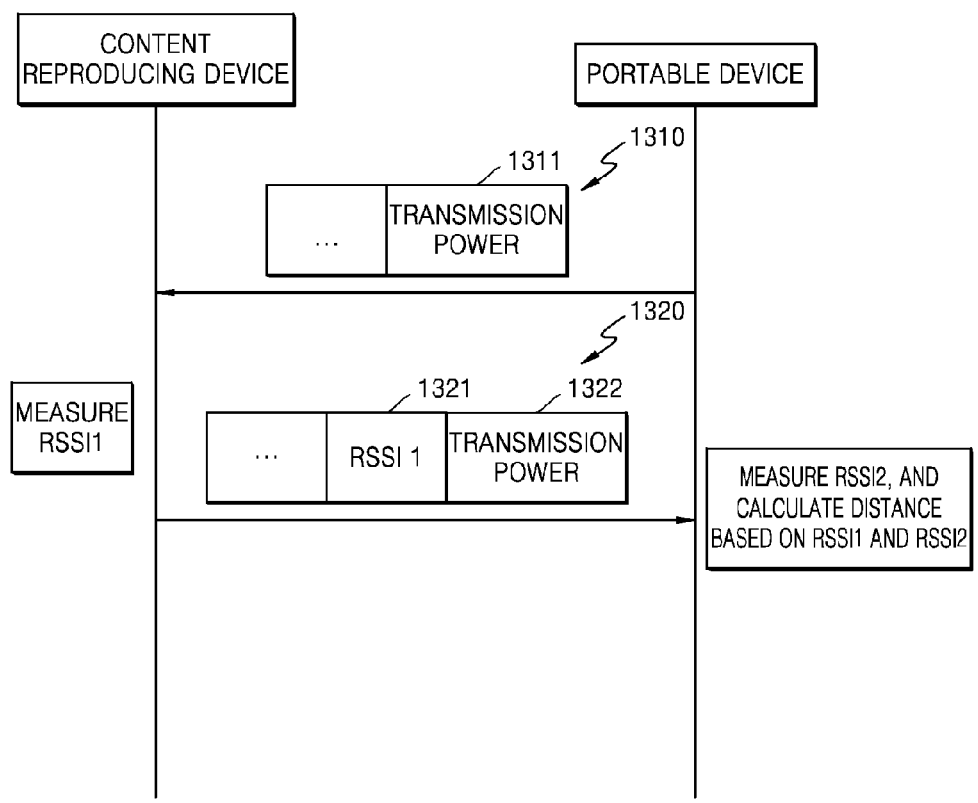
FIG. 13 illustrates a reference diagram for describing a method of determining a distance between the portable device and the content reproducing device based on transmission power and a received signal strength indicator (RSSI) of a signal as shown in FIG. 12.

FIG. 13 illustrates a reference diagram for describing a method of determining a distance between the portable device 100 and the content reproducing device 200 based on transmission power and an RSSI of a signal as shown in FIG. 12.

Referring to FIG. 13, the portable device 100 transmits a signal 1310 including transmission power 1311 to the content reproducing device 200. The content reproducing device 200 may measure an RSSI1 1321 when the signal 1310 is received and calculate a distance between the content reproducing device 200 and the portable device 100 based on the transmission power 1311 received from the portable device 100 and the RSSI1 1321.

The content reproducing device 200 transmits, to the portable device 100, a signal 1320 including the RSSI1 1321 measured by the content reproducing device 200 and transmission power 1322 when the signal 1320 is transmitted.

The portable device 100, which has received the signal 1320, may calculate a distance between the content reproducing device 200 and the portable device 100 based on the transmission power 1322 and an RSSI2 measured when the signal 1320 is received. The portable device 100 may determine a distance between the content reproducing device 200 and the portable device 100 based on the RSSI1 1321 included in the signal 1320, with a higher reliability. For example, it is assumed that the portable device 100 transmits the signal 1310 including the transmission power 1311 of 10 dBm to the content reproducing device 200, and an RSSI measured when the content reproducing device 200 receives the signal 1310 is −65 dBm. Then, the content reproducing device 200 may transmit the signal 1320 including the RSSI1 1321 of −65 dBm and transmission power 1322 of 10 dBm to the portable device 100. If an RSSI measured by the portable device 100 when the signal 1320 is received is −63 dBm, the portable device 100 may determine a relatively reliable distance between the content reproducing device 200 and the portable device 100 based on 63 dBm measured by the portable device 100 and −65 dBm which is value of the RSSI1 1321 received from the content reproducing device 200.

Referring back to FIG. 11, in operation 1120, the portable device 100 periodically transmits a signal including information about content being reproduced by the portable device 100 and signal strength information to the content reproducing device 200. As such, by receiving, by the portable device 100, a signal including content information from the content reproducing device 200 and transmitting information about content being reproduced by the portable device 100 to the content reproducing device 200, the content reproducing device 200 may also acquire useful information by using the signal received from the portable device 100 and perform a particular task by using the acquired information or use the acquired information for user management such as collection of user preference information.

A format of the signal transmitted from the portable device 100 to the content reproducing device 200 may be one of the formats shown in FIGS. 6A, 6B, and 12.

Figure 14:
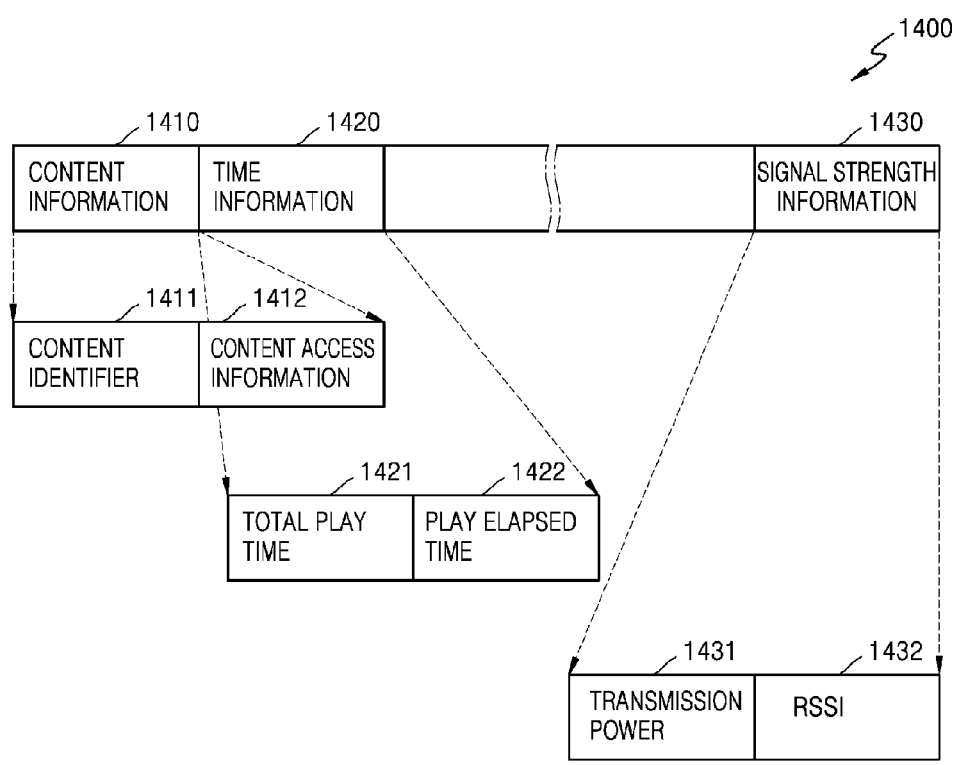
FIG. 14 illustrates a signal transmitted by the portable device to the content reproducing device, according to an exemplary embodiment.

FIG. 14 illustrates a signal 1400 transmitted by the portable device 100 to the content reproducing device 200, according to an exemplary embodiment.

Referring to FIG. 14, the signal 1400 may include content information 1410, time information 1420, and signal strength information 1430.

The content information 1410 is information about content being reproduced by the portable device 100 and may include a content identifier 1411 and content access information 1412.

The time information 1420 is time information of the content being reproduced by the portable device 100 and may include a total play time 1421 of the content and a play elapsed time 1422 of the content.

The signal strength information 1430 may include transmission power 1431 when the portable device 100 transmits the signal 1400 and an RSSI 1432 measured by the portable device 100.

Referring back to FIG. 11, in operation 1130, the portable device 100 calculates a degree of proximity between the content reproducing device 200 and the portable device 100 based on the signal strength information included in the signal received from the content reproducing device 200. As described above, if an RSSI is included in the signal received from the content reproducing device 200, the portable device 100 may calculate a relatively reliable degree of proximity between the content reproducing device 200 and the portable device 100.

In operation 1140, the portable device 100 outputs a notification for inquiring about continuous play of content if the calculated degree of proximity satisfies the predefined condition.

In operation 1150, the portable device 100 accesses and continuously reproduces the content being reproduced by the content reproducing device 200 in response to a user input of selecting continuous play of content.

Figure 15:
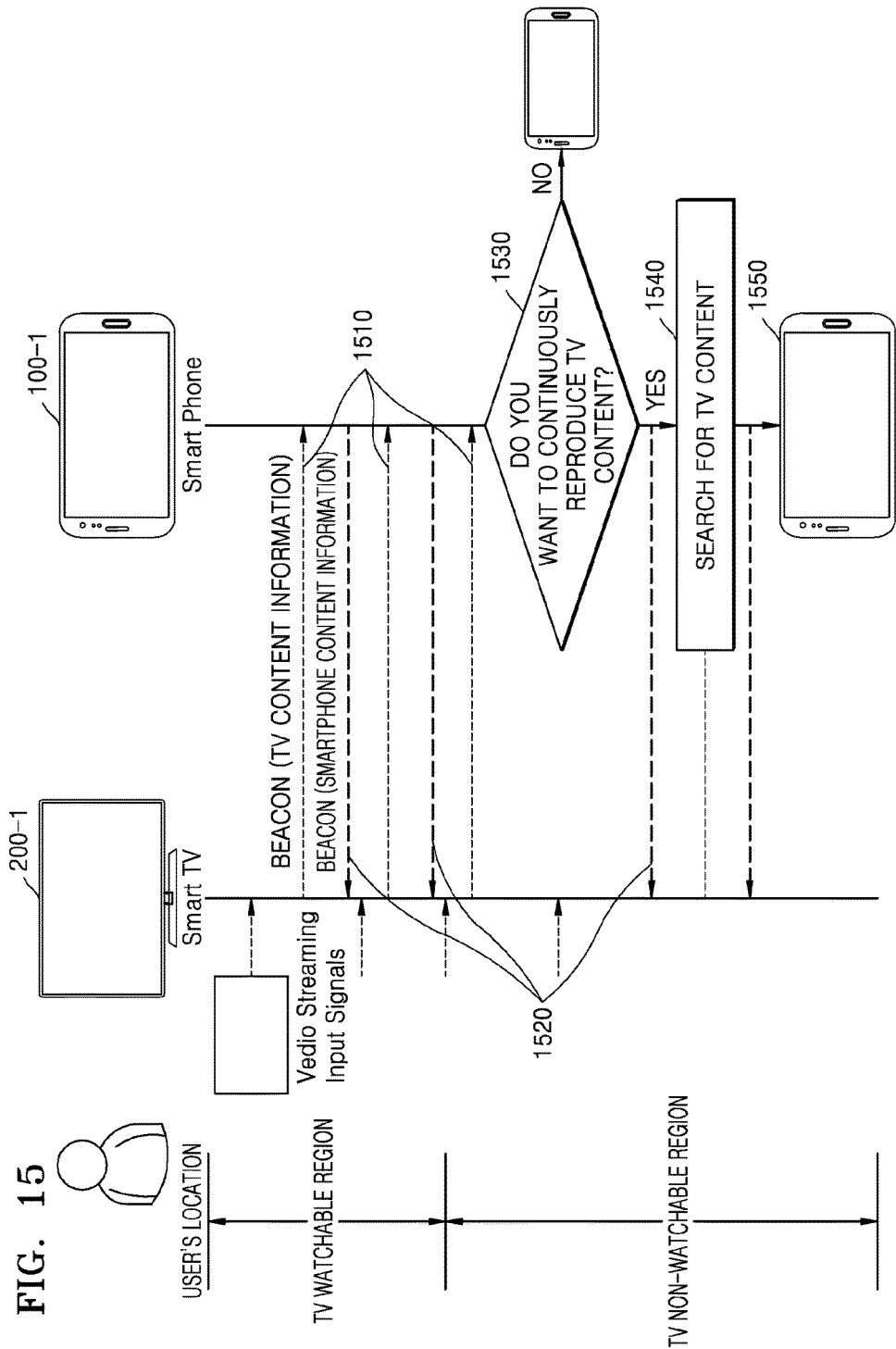
FIG. 15 illustrates a signaling diagram of signals transmitted according to the exemplary embodiment of FIG. 11.

FIG. 15 illustrates a signaling diagram of signals transmitted according to the exemplary embodiment of FIG. 11.

Referring to FIG. 15, while the user is watching content through the smart TV 200-1, a type of a content reproducing device, in a TV watchable region by holding the smartphone 100-1, a type of a portable device, the smart TV 200-1 periodically transmits a beacon 1510 including information about content being reproduced by the smart TV 200-1 and an RSSI to the smartphone 100-1.

The smartphone 100-1 also periodically transmits a beacon 1520 including information about content being reproduced by the smartphone 100-1 and an RSSI to the smart TV 200-1. Alternatively, the smart TV 200-1 may transmit a request message to the smartphone 100-1 to receive the beacon 1520 from the smartphone 100-1.

The smartphone 100-1 periodically receives the beacon 1510 from the smart TV 200-1 and may determine a degree of proximity between the smartphone 100-1 and the smart TV 200-1 by using the RSSI included in the beacon 1510 and a measured RSSI. Alternatively, the smartphone 100-1 may transmit a request message to the smart TV 200-1 to receive the beacon 1510 from the smart TV 200-1.

The smartphone 100-1 may detect a real-time distance between the smartphone 100-1 and the smart TV 200-1 by using the real-time beacon 1510 received from the smart TV 200-1. If the smartphone 100-1 determines that a distance between the smartphone 100-1 and the smart TV 200-1 is greater than a predefined threshold value, the smartphone 100-1 may determine that the user moves out of the TV watchable region with holding the smartphone 100-1 and inquire the user about continuous play of TV content. That is, the smartphone 100-1 inquires about continuous play of TV content by displaying a popup window including a message "do you want to continuously reproduce TV content?" on a display in operation 1530.

If the user does not select continuous play in response to the popup window displayed on the display of the smartphone 100-1, this flow ends.

If the user selects continuous play in response to the popup window displayed on the display of the smartphone 100-1, the smartphone 100-1 searches for the content being reproduced by the smart TV 200-1 by referring to the TV content information included in the beacon 1510 periodically received from the smart TV 200-1 in operation 1540 and continuously reproduces the searched content on the display of the smartphone 100-1 in operation 1550.

Once the smartphone 100-1 starts reproducing the content, the smart TV 200-1 may be powered off or enter a sleep mode. Alternatively, the smart TV 200-1 may continue to reproduce the content even after the smartphone 100-1 starts reproducing the content so that the content is simultaneously reproduced by two different devices 100-1 and 200-1 for multiple viewers.

Figure 16:
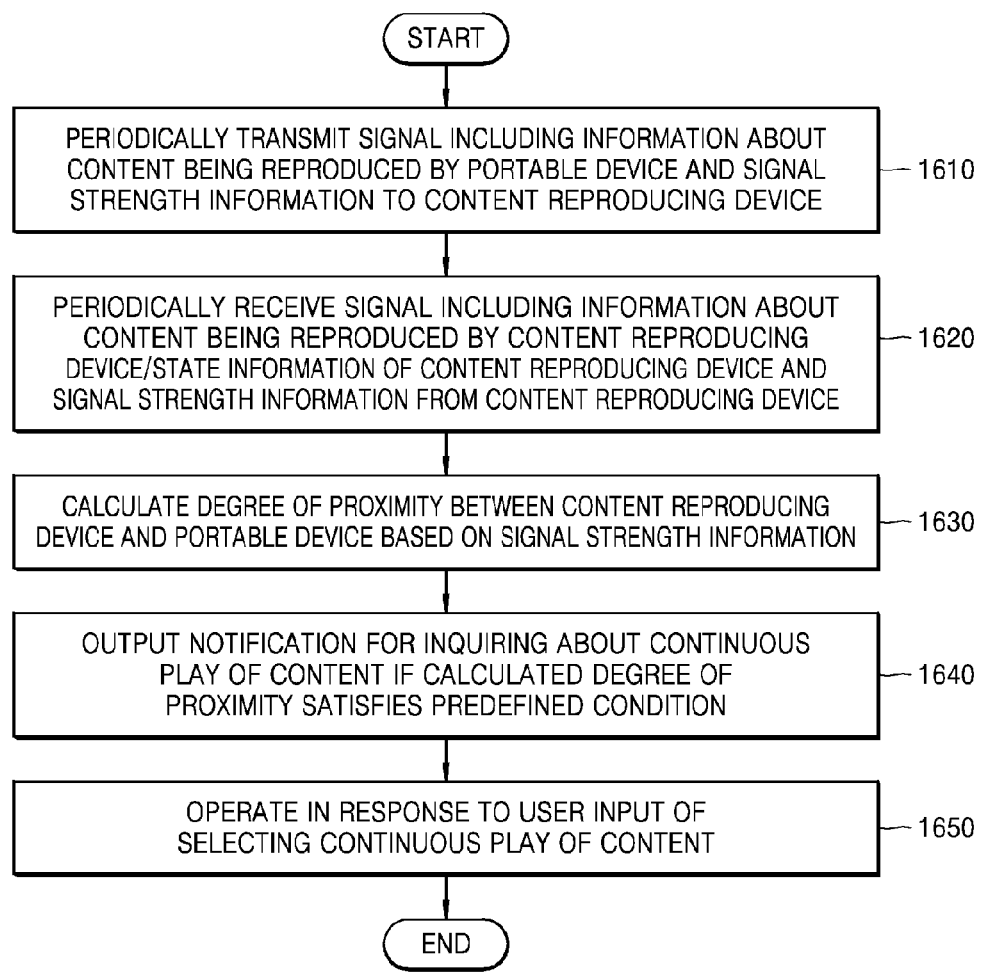
FIG. 16 illustrates a flowchart of an operation of continuously reproducing content, which is being reproduced by the portable device, by using the content reproducing device, according to an exemplary embodiment.

FIG. 16 illustrates a flowchart of an operation of continuously reproducing content, which is being reproduced by the portable device 100, by using the content reproducing device 200, according to an exemplary embodiment.

Referring to FIG. 16, in operation 1610, the portable device 100 periodically transmits a signal including information about content being reproduced by the portable device 100 and signal strength information to the content reproducing device 200.

The signal including the information about content and signal strength information, which is periodically transmitted from the portable device 100 to the content reproducing device 200, may have the format shown in FIG. 14.

In operation 1620, the portable device 100 periodically receives a signal including information about content being reproduced by the content reproducing device 200 from the content reproducing device 200. The signal may also include state information of the content reproducing device 200 and signal strength information.

While the portable device 100 is reproducing content, the content reproducing device 200 may be in a state of reproducing content or in a standby mode state without reproducing content. For example, when the content reproducing device 200 is a TV, the TV may be in a normal mode state of outputting a broadcast signal or in a standby mode state in which the TV is immediately switchable to the normal mode in response to an input from a remote control device.

If the content reproducing device 200 is reproducing content, the content reproducing device 200 may transmit a signal including the content being reproduced by the content reproducing device 200 and signal strength information to the portable device 100. In this case, the portable device 100 may receive the signal including the content being reproduced by the content reproducing device 200 and signal strength information as shown in FIG. 12.

If the content reproducing device 200 is in the standby mode, the content reproducing device 200 may transmit a signal including state information of the content reproducing device 200 and signal strength information, and the portable device 100 receives this signal. Even in the standby mode, the content reproducing device 200 may perform a function of periodically receiving and transmitting a signal by supplying power to, for example, a portion of the communication interface 215 of the content reproducing device 200. A Bluetooth module may be used as the portion of the communication interface 215 taking in charge of periodical transmission and reception of a signal even in the standby mode.

Figure 17:
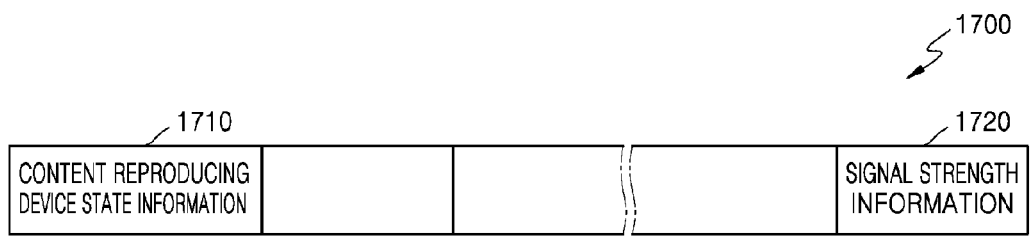
FIG. 17 illustrates a signal including content reproducing device state information and signal strength information, according to an exemplary embodiment.

FIG. 17 illustrates a signal 1700 including content reproducing device state information 1710 and signal strength information 1720, according to an exemplary embodiment.

Referring to FIG. 17, the signal 1700 may include the content reproducing device state information 1710 and the signal strength information 1720. The content reproducing device state information 1710 may include, for example, state information indicating that the content reproducing device 200 is in the standby mode. The signal strength information 1720 may include transmission power information or transmission power and an RSSI as described above.

Referring back to FIG. 16, in operation 1630, the portable device 100 calculates a degree of proximity between the content reproducing device 200 and the portable device 100 based on the signal strength information.

In operation 1640, the portable device 100 outputs a notification for inquiring about continuous play of content if the calculated degree of proximity satisfies the predefined condition. For example, the portable device 100 may output a notification for inquiring about continuous play of content by using a UI as shown in FIG. 18.

Figure 18:
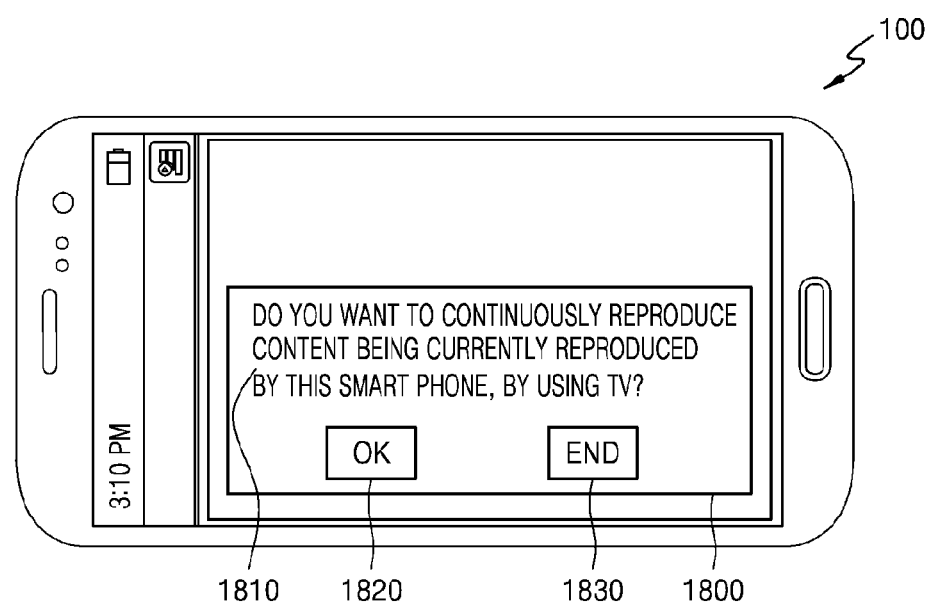
FIG. 18 illustrates a UI for inquiring about continuous play of content, which is output by the portable device through a display, according to an exemplary embodiment.

FIG. 18 illustrates a UI 1800 for inquiring about continuous play of content, which is output by the portable device 100 through the display 115, according to an exemplary embodiment.

Referring to FIG. 18, the UI 1800 includes a message "do you want to continuously reproduce content being currently reproduced, by using a TV?" 1810, an item "OK" 1820 for selecting continuous play of content in response to this inquiry, and an item "END" 1830" for ending this UI window. For example, if the user selects the item "OK" 1820, the portable device 100 performs an operation for continuous play of content, otherwise if the user selects the item "END" 1830", the portable device 100 ends the UI window without performing the operation for continuous play of content.

Referring back to FIG. 16, in operation 1650, the portable device 100 operates in response to a user input of selecting continuous play of content.

For example, the portable device 100 may perform an operation for continuous play of content in response to a user input of selecting continuous play of content on the UI 1800 as shown in FIG. 18.

When a user input of selecting that the content being reproduced by the portable device 100 is continuously reproduced by the content reproducing device 200 is received, the content reproducing device 200 may be reproducing other content in the normal mode or be in the standby mode.

The state in which the content reproducing device 200 is in the standby mode indicates that no other users watch content by using the content reproducing device 200, and thus, in this case, there is no problem in controlling the content reproducing device 200 to continuously reproduce the content being reproduced by the portable device 100.

Figure 19:
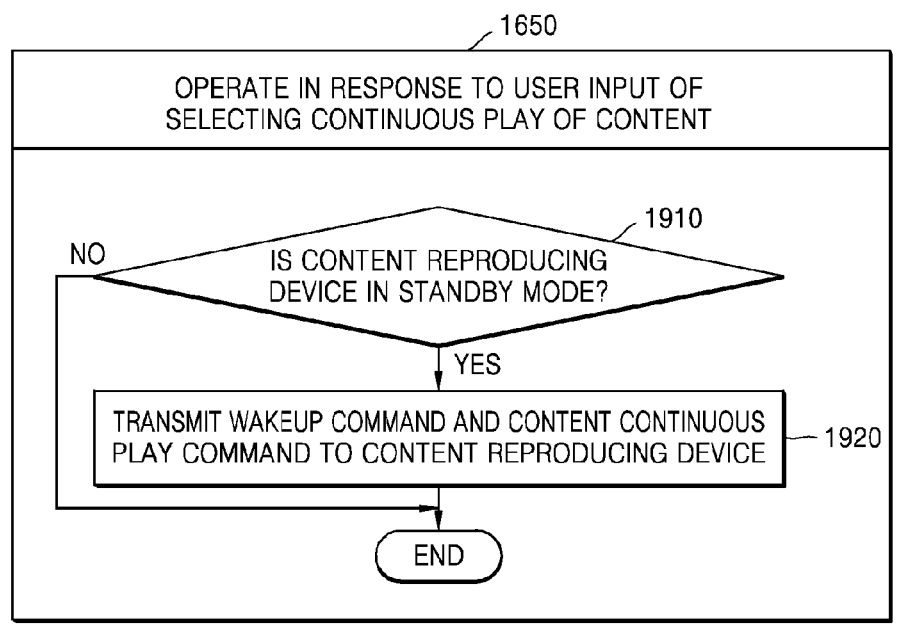
FIG. 19 illustrates a flowchart of an operation of operating in response to a user input of selecting continuous play of content, according to an exemplary embodiment.

However, the state in which the content reproducing device 200 is in the normal mode indicates that other users use the content reproducing device 200, and thus, in this case, additional operations may be performed as shown in FIG. 19.

FIG. 19 illustrates a flowchart of an operation of operating in response to a user input of selecting continuous play of content, according to an exemplary embodiment.

Referring to FIG. 19, in operation 1910, the portable device 100 determines whether the content reproducing device 200 is in the normal mode. The portable device 100 may check whether the content reproducing device 200 is in the normal mode, based on a signal received from the content reproducing device 200. As described above with reference to FIG. 16, the content reproducing device 200 may transmit a signal including information about content to the portable device 100 if the content reproducing device 200 is reproducing the content but transmit a signal including content reproducing device state information to the portable device 100 if the content reproducing device 200 is in the standby mode.

As a result of the determination, if the content reproducing device 200 is not in the standby mode, this indicates that other users use the content reproducing device 200, and in this case, if the user controls the content reproducing device 200 to reproduce content, which is being reproduced by the portable device 100, in response to a selection of the user of the portable device 100, this control interrupts content watching of other users using the content reproducing device 200, and thus to prevent the interruption, this flow ends.

Otherwise, if the content reproducing device 200 is in the standby mode, this indicates that there are no other users using the content reproducing device 200 at the moment, and thus, an operation of reproducing the content, which is being reproduced by the portable device 100, by using the content reproducing device 200 is performed in response to a user's selection in operation 1920. The portable device 100 may transmit a signal including a wakeup command for waking up the content reproducing device 200 from the standby mode to the normal mode and a content continuous play command to the content reproducing device 200.

Figure 20:
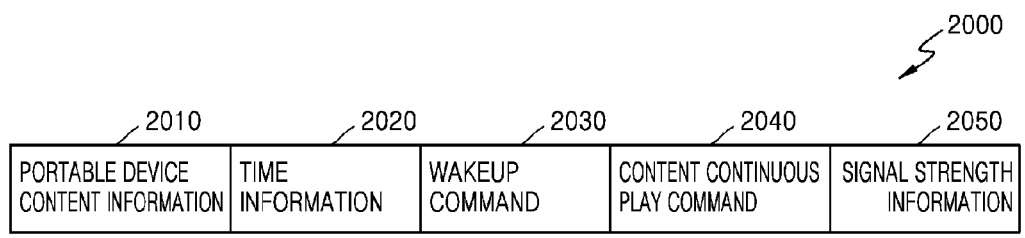
FIG. 20 illustrates a signal including a wakeup command, by which the portable device wakes up the content reproducing device from a standby mode to a normal mode, and a content continuous play command, according to an exemplary embodiment.

FIG. 20 illustrates a signal 2000 including a wakeup command 2030, by which the portable device 100 wakes up the content reproducing device 200 from the standby mode to the normal mode, and a content continuous play command 2040, according to an exemplary embodiment.

Referring to FIG. 20, the signal 2000 may include content information 2010, time information 2020, the wakeup command 2030, the content continuous play command 2040, and signal strength information 2050.

The signal 2000 shown in FIG. 20 further includes the wakeup command 2030 and the content continuous play command 2040 in addition to the signal transmitted from the portable device 100 to the content reproducing device 200 in operation 1610 of FIG. 16.

The content information 2010, the time information 2020, and the signal strength information 2050 are the same as those in the signals described above, and thus a detailed description thereof is omitted.

The wakeup command 2030 is a command for switching a state of the content reproducing device 200 from the standby mode to the normal mode. If the communication interface 250 of the content reproducing device 200 receives the wakeup command 2030, the communication interface 250 may control the power supply 230 to supply power to each component, thereby switching the content reproducing device 200 to the normal mode.

The communication interface 250 of the content reproducing device 200 may transmit a signal indicating reception of the content continuous play command 2040 to the controller 280, and the controller 280 may access content being reproduced by the portable device 100 and reproduce the accessed content, in response to the content continuous play command 2040. Based on the time information 2020, the content reproducing device 200 may reproduce the content by continuing a reproduction point of the content reproduced by the portable device 100 till a current time point, thereby continuously reproducing the content.

In the exemplary embodiment of FIG. 20, although the signal 2000 is illustrated as including both the wakeup command 2030 and the content continuous play command 2040, the wakeup command 2030 and the content continuous play command 2040 may be separately transmitted.

Although it has been described in operation 1920 of FIG. 19 that the portable device 100 directly transmits a signal including a wakeup command to the content reproducing device 200, operation 1920 of FIG. 19 may be performed according to other exemplary embodiments.

For example, the portable device 100 may transmit a wakeup signal to a content providing server for providing content, and the content providing server may transmit the wakeup signal to the content reproducing device 200 via the network 70. To operate according to this scenario, the content reproducing device 200 needs to be W-Fi- or Internet-connected even in the standby mode.

Figure 21A:
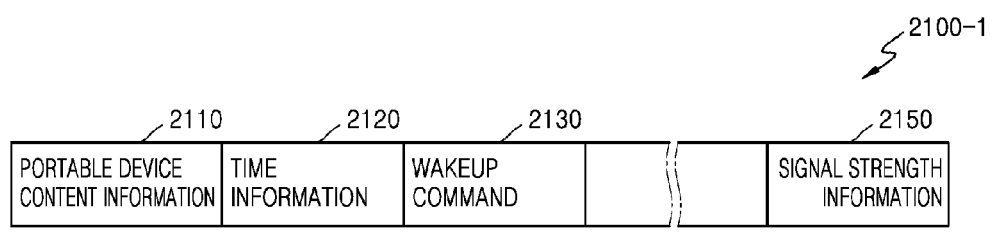
FIGS. 21A and 21B illustrate signals respectively including a wakeup command, by which the portable device wakes up the content reproducing device from a standby mode to a normal mode, and a content continuous play command, according to an exemplary embodiment.
Figure 21B:
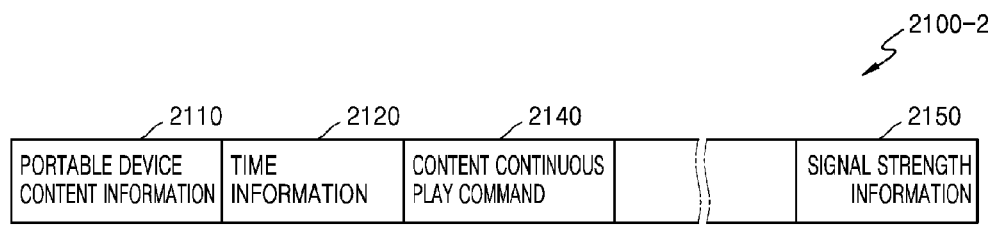

FIGS. 21A and 21B illustrate signals 2100-1 and 2100-2 respectively including a wakeup command 2130, by which the portable device 100 wakes up the content reproducing device 200 from the standby mode to the normal mode, and a content continuous play command 2140, according to an exemplary embodiment.

The signal 2100-1 shown in FIG. 21A may include content information 2110, time information 2120, the wakeup command 2130, and signal strength information 2150.

The signal 2100-2 shown in FIG. 21B may include the content information 2110, the time information 2120, the content continuous play command 2140, and the signal strength information 2150.

The portable device 100 may transmit one signal including a wakeup command and a content continuous play command as shown in FIG. 20 or transmit two signals respectively including a wakeup command and a content continuous play command as shown in FIGS. 21A and 21B. How to insert a wakeup command and a content continuous play command in at least one signal may be variously determined.

Figure 22:
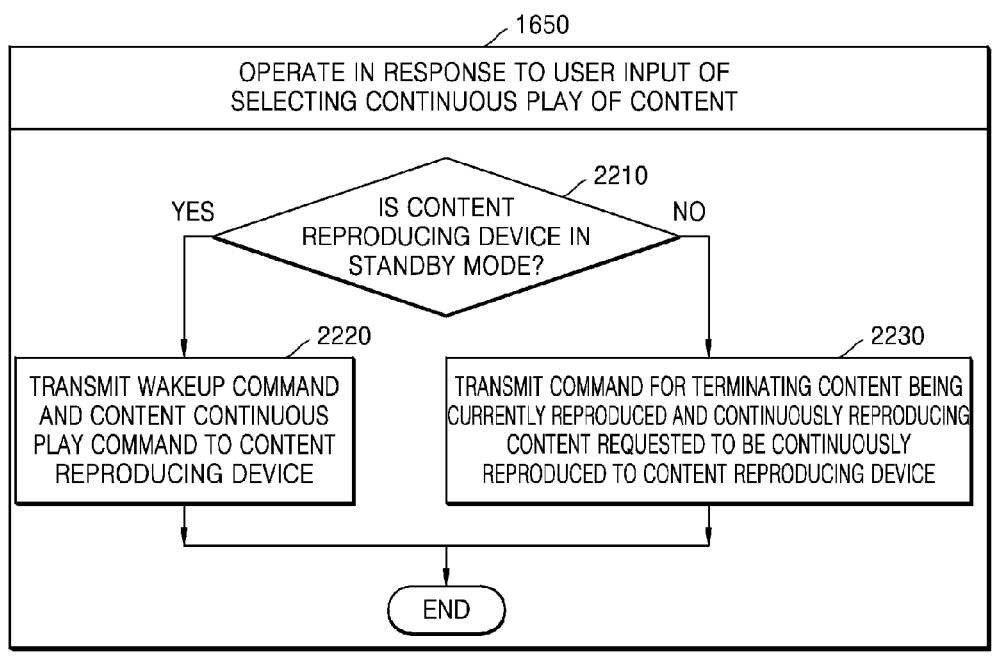
FIG. 22 illustrates a flowchart of an operation of operating in response to a user input of selecting continuous play of content, according to another exemplary embodiment.

FIG. 22 illustrates a flowchart of an operation of operating in response to a user input of selecting continuous play of content, according to another exemplary embodiment.

Referring to FIG. 22, in operation 2210, the portable device 100 determines whether the content reproducing device 200 is in the normal mode.

As a result of the determination, if the content reproducing device 200 is in the standby mode, the portable device 100 transmits at least one signal including a wakeup command for waking up the content reproducing device 200 and a content continuous play command to the content reproducing device 200 in operation 2220.

Otherwise, if the content reproducing device 200 is not in the standby mode, the portable device 100 transmits a signal including a content continuous play command for continuously reproducing content being reproduced by the portable device 100 to the content reproducing device 200 in operation 2230.

A state in which the content reproducing device 200 is not in the standby mode indicates high possibility that another user is already watching other content by using the content reproducing device 200. However, even in this case, according to policy, a command may be executed by the content reproducing device 200 to terminate outputting the content being reproduced by the content reproducing device 200 at the moment and to continuously reproduce content being reproduced by the portable device 100.

Figure 23:
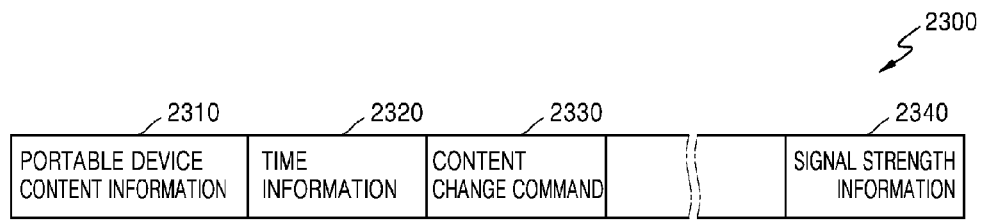
FIG. 23 illustrates a content change signal transmitted by the portable device to the content reproducing device, according to an exemplary embodiment.

FIG. 23 illustrates a content change signal 2300 transmitted by the portable device 100 to the content reproducing device 200, according to an exemplary embodiment.

Referring to FIG. 23, the signal 2300 may include information 2310 about content being reproduced by the portable device 100, time information 2320, a content change command 2330, and signal strength information 2340.

The content information 2310, the time information 2320, and the signal strength information 2340 are the same as described above. The content change command 2330 instructs the content reproducing device 200 to terminate content being reproduced by the content reproducing device 200 at the moment and to access the content being reproduced by the portable device 100 by referring to the content information 2310 and reproduce the accessed content.

The content change command 2330 may be transmitted through an additional field in a signal periodically transmitted from the portable device 100 to the content reproducing device 200 as shown in FIG. 23 or may be transmitted using a signal other than the signal periodically transmitted from the portable device 100 to the content reproducing device 200.

Figure 24:
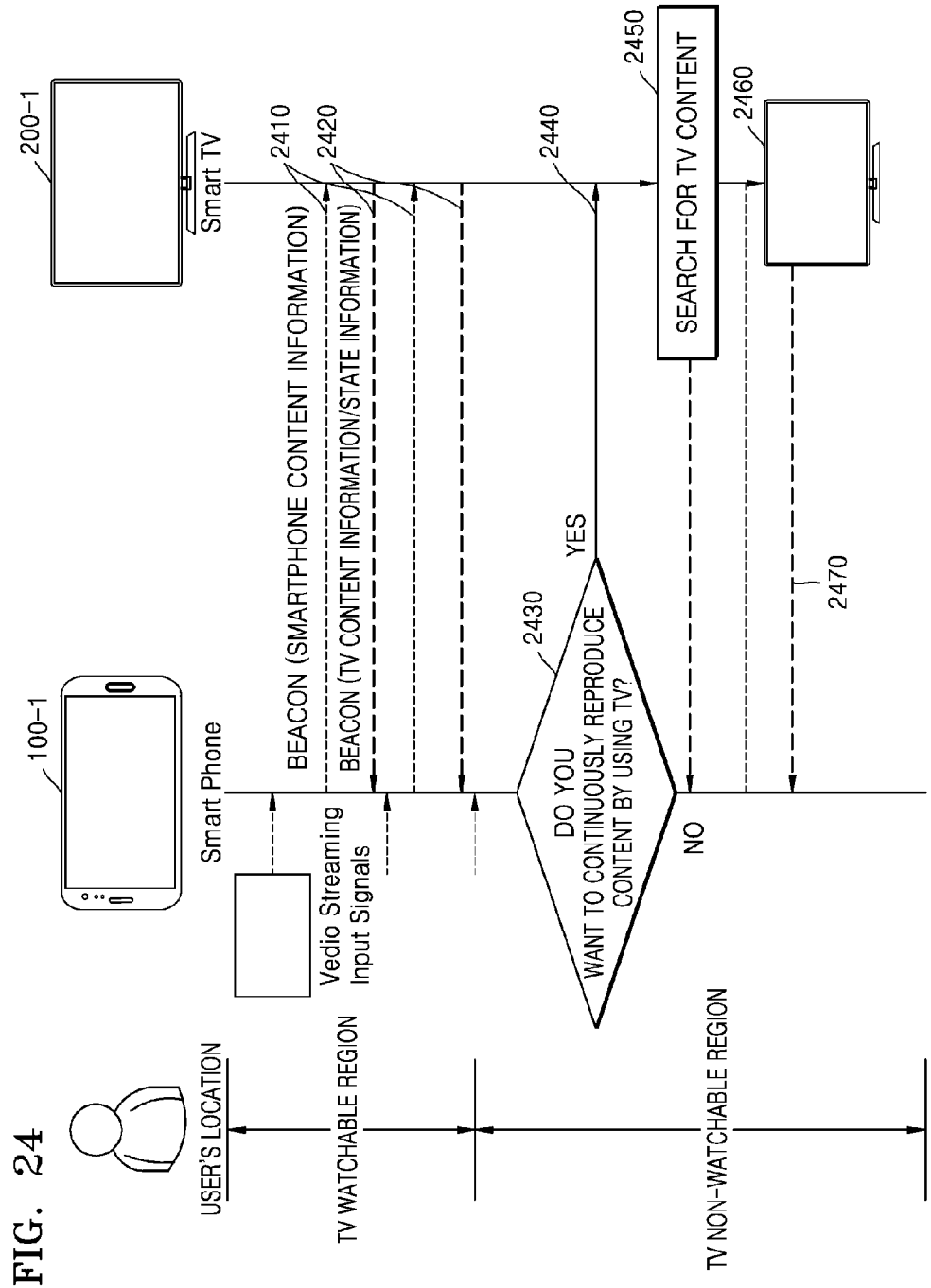
FIG. 24 illustrates a signaling diagram of signals transmitted according to the exemplary embodiment of FIG. 16.

FIG. 24 illustrates a signaling diagram of signals transmitted according to the exemplary embodiment of FIG. 16.

Referring to FIG. 24, the user watches content through the smartphone 100-1, a type of a portable device. The smartphone 100-1 receives and reproduces a video streaming input signal.

The smartphone 100-1 periodically transmits a beacon 2410 including information about content being reproduced by the smartphone 100-1 and an RSSI to the smart TV 200-1.

The smart TV 200-1 periodically transmits a beacon 2420 including state information of the smart TV 200-1 and an RSSI to the smartphone 100-1. If the smart TV 200-1 is reproducing content in the normal mode, the smart TV 200-1 may transmit information about the content being reproduced by the smart TV 200-1 to the smartphone 100-1.

The smartphone 100-1 periodically receives the beacon 2420 from the smart TV 200-1 and may determine a degree of proximity between the smartphone 100-1 and the smart TV 200-1 by using the RSSI included in the beacon 2420.

The smartphone 100-1 may detect a real-time distance between the smartphone 100-1 and the smart TV 200-1 by using the real-time beacon 2420 received from the smart TV 200-1. If the smartphone 100-1 determines that a degree of proximity between the smartphone 100-1 and the smart TV 200-1 satisfies the predefined condition, i.e., if the smartphone 100-1 determines that the user enters a TV watchable range because the distance between the smartphone 100-1 and the smart TV 200-1 is close, the smartphone 100-1 may inquire the user about "continuous play of content through a TV". That is, the smartphone 100-1 inquires about continuous play of TV content by displaying a popup window including a message "do you want to continuously reproduce content by using a TV?" on the display 115 in operation 2430.

If the user does not select continuous play in response to the popup window displayed on the display 115, the smartphone 100-1 simply closes the popup window.

If the user selects continuous play in response to the popup window displayed on the display 115, the smartphone 100-1 transmits at least one signal 2440 including a wakeup command and a content continuous play command to the smart TV 200-1.

If the smart TV 200-1 is in the standby mode, the smart TV 200-1 switches the standby mode to the normal mode in response to the wakeup command received from the smartphone 100-1 and searches for corresponding content by referring to the content information received from the smartphone 100-1 in operation 2450 and accesses and reproduces the corresponding content in operation 2460.

In addition, the smart TV 200-1 may periodically transmit a signal 2470 including information about the content being reproduced thereby to the smartphone 100-1.

Figure 25:
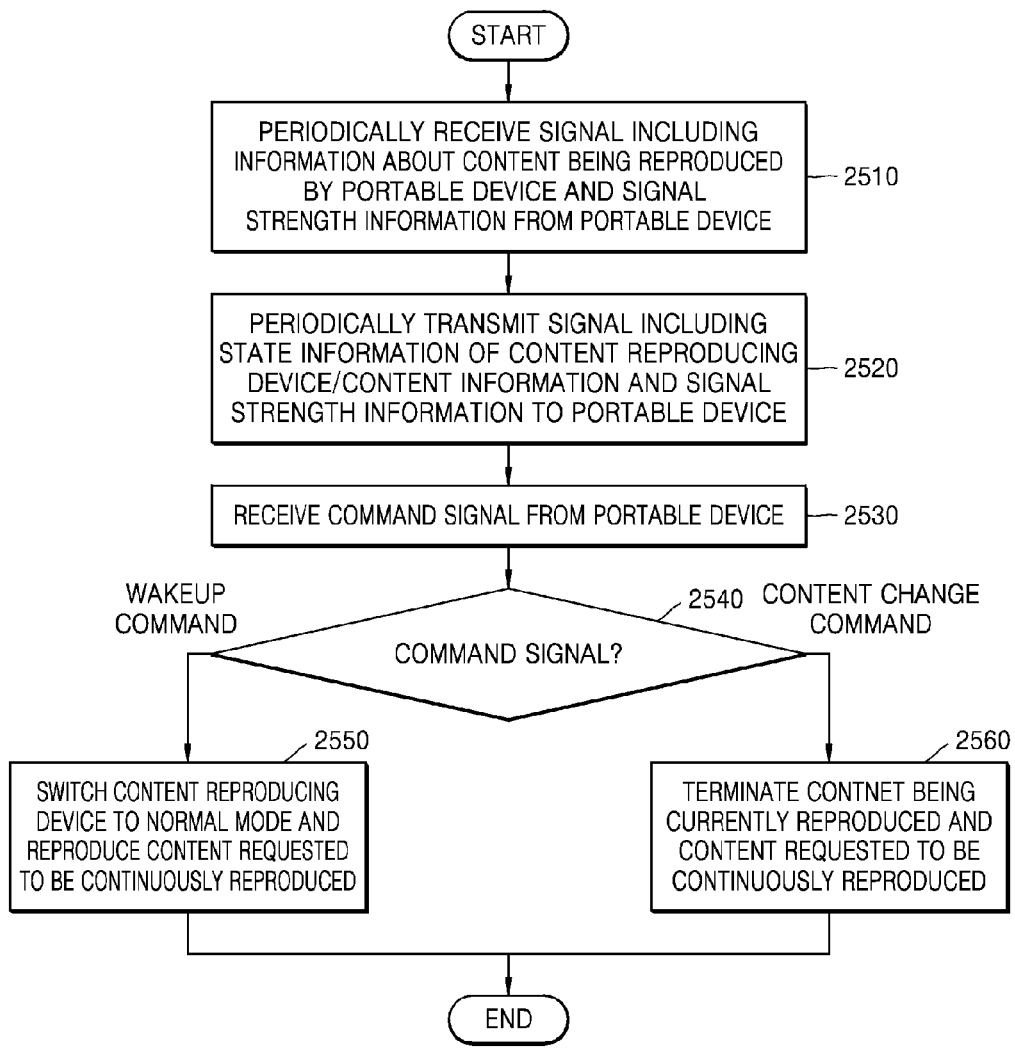
FIG. 25 illustrates a flowchart of an operation of the content reproducing device, according to an exemplary embodiment.

FIG. 25 illustrates a flowchart of an operation of the content reproducing device 200, according to an exemplary embodiment. The operation of FIG. 25 is an operation of a case where the portable device 100 detects a degree of proximity between the portable device 100 and the content reproducing device 200 and transmits a content continuous play command to the content reproducing device 200 in a scenario in which the content reproducing device 200 continuously reproduce content being reproduced by the portable device 100.

Referring to FIG. 25, in operation 2510, the content reproducing device 200 periodically receives a signal including information about the content being reproduced by the portable device 100 and signal strength information from the portable device 100.

In operation 2520, the content reproducing device 200 periodically transmits a signal including state information of the content reproducing device 200 or information about content being reproduced by the content reproducing device 200 and signal strength information to the portable device 100.

In operation 2530, the portable device 100 monitors a degree of proximity between the portable device 100 and the content reproducing device 200 based on the signal strength information received from the content reproducing device 200, and if the monitored degree of proximity satisfies the predefined condition, the portable device 100 displays a UI for inquiring about continuous play of content, and if a user input of selecting continuous play of content in response to the inquiry, the portable device 100 transmits a signal including a command to the content reproducing device 200. Accordingly, the content reproducing device 200 receives the signal including the command from the portable device 100.

In operation 2540, the content reproducing device 200 analyzes the command included in the signal received from the portable device 100.

If the signal received from the portable device 100 includes a wakeup command and a content continuous play command, the content reproducing device 200 switches from the standby mode to the normal mode and accesses and reproduces the content being reproduced by the portable device 100 by referring to the content information periodically received from the portable device 100 in operation 2550.

Otherwise, if the signal received from the portable device 100 includes a content change command, the content reproducing device 200 terminates outputting the content being reproduced at the moment and accesses and reproduces the content being reproduced by the portable device 100 by referring to the content information received from the portable device 100 in operation 2560.

Figure 26:
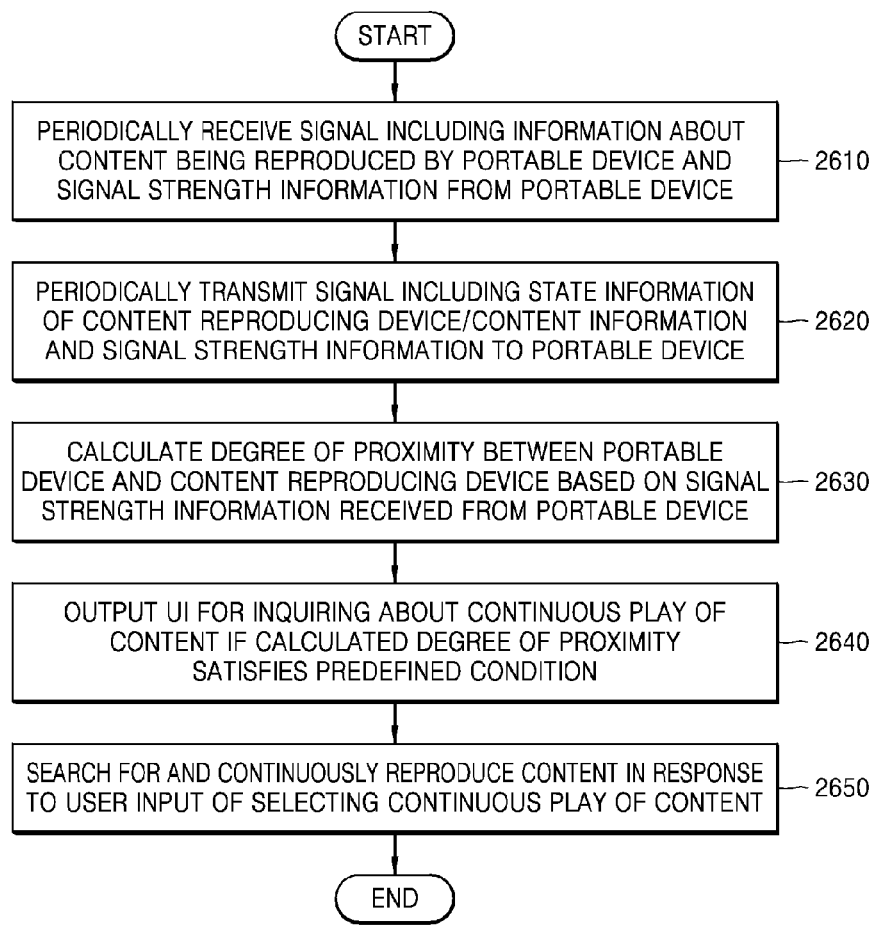
FIG. 26 illustrates a flowchart of an operation of the content reproducing device, according to another exemplary embodiment.

FIG. 26 illustrates a flowchart of an operation of the content reproducing device 200, according to another exemplary embodiment. The operation of FIG. 26 is an operation of a case where the content reproducing device 200 detects a degree of proximity between the portable device 100 and the content reproducing device 200 and outputs a UI for inquiring about continuous play of content in a scenario in which the content reproducing device 200 continuously reproduce content being reproduced by the portable device 100.

Referring to FIG. 26, in operation 2610, the content reproducing device 200 periodically receives a signal including information about the content being reproduced by the portable device 100 and signal strength information from the portable device 100.

In operation 2620, the content reproducing device 200 periodically transmits a signal including state information of the content reproducing device 200 or information about content being reproduced by the content reproducing device 200 and signal strength information to the portable device 100.

In operation 2630, the content reproducing device 200 calculates a degree of proximity between the portable device 100 and the content reproducing device 200 based on the signal strength information received from the portable device 100.

In operation 2640, the content reproducing device 200 outputs a UI for inquiring about continuous play of content through the display 215 of the content reproducing device 200 if the calculated degree of proximity satisfies the predefined condition.

In operation 2650, the content reproducing device 200 searches for the content being reproduced by the portable device 100 by referring to the content information received from the portable device 100 and continuously reproduces the searched content if a user input of selecting continuous play of content is received.

The term "module" used in the various exemplary embodiments may indicate a unit including hardware, software, and firmware, taken alone or in combination. The module may be interchangeably used with the term, for example, unit, logic, logical block, component, or circuit. The module may be a minimum unit of an integrally formed component or a portion thereof. The module may be a minimum unit for performing one or more functions of a portion thereof. The module may be implemented mechanically or electronically. For example, the module according to one or more exemplary embodiments may include at least one of an application-specific integrated circuit (ASIC) chip, field-programmable gate arrays (FPGAs), and a programmable-logic device.

According to one or more exemplary embodiments, at least a portion of a device (e.g., modules or functions thereof) or a method (e.g., operations) may be implemented as instructions stored in a non-transitory computer-readable storage medium in a form of, for example, a programming module. When the instructions are executed by one or more processors, the one or more processors may perform a function corresponding to the instructions. The non-transitory computer-readable storage medium may be the memory. At least a portion of the programming module may be implemented (e.g., executed) by, for example, the processor. At least a portion of the programming module may include, for example, a module, a program, a routine, a set of instructions, or a process for performing one or more functions.

The non-transitory computer-readable storage medium may include magnetic media such as hard disks, floppy disks, and magnetic tapes, optical media such as compact disc read only memories (CD-ROMs) and digital versatile discs (DVDs), magneto-optical media such as floptical disks, and hardware devices specially configured to store and perform program instructions (e.g., programming modules), such as ROM. RAM, and flash memory. In addition, the program instructions may include not only machine language codes compiled by a compiler but also high-level language codes executable by a computer by using an interpreter or the like. The hardware devices described above may be configured to operate as one or more software modules so as to perform the operations of the various exemplary embodiments, and vice versa.

A module or programming module according to the various exemplary embodiments may include at least one of the components described above, omit a portion thereof, or further include additional other components. Operations performed by the module or programming module according to the various embodiments or another component may be performed in a sequential, parallel, repetitive, or heuristic method. In addition, a portion of the operations may be performed in another sequence or omitted, or other operations may be added thereto.

The exemplary embodiments have been described by referring to different functional units and processes for clear understanding. However, it would be obvious that functions may be properly distributed between the different functional units and processes without departing from identity of the inventive concept. For example, functions described to be performed by independent processors or controllers may be performed by a same processor or controller, and according to circumstances, the functions may be exchanged to each other. That is, it should be analyzed that quotation of special functional units does not indicate a rigid logical or physical structure or organization but indicate a proper means for performing the function.

Although the inventive concept has been described with several exemplary embodiments, the inventive concept is not limited to the particular forms described above. The scope of the inventive concept is only limited by the claims. In addition, even though features of the inventive concept seem to be described only in relation to some exemplary embodiments, it would be obvious to those of ordinary skill in the art that the exemplary embodiments described above are combinable. In the claims, the term "comprise" does not limit the existence of additional one or more other components or operations.

In addition, although many means, components, and operations are listed one by one, the means, components, and operations may be implemented by one unit or processor. In addition, although individual features are included in different claims, the individual features may be combined, and even though the individual features are included in different claims, it does not mean that combination of the individual features is impossible or in advantageous. In addition, a feature included in only one category of claims is not limited to the category and may be equivalently applied to other claims of other categories in a proper manner.

According to one or more exemplary embodiments, a service of continuously reproducing content between a plurality of devices without requiring a complicated procedure may be provided.

The foregoing exemplary embodiments are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A portable device comprising:
a display;
a communication interface; and
a controller configured to:
periodically receive, from a content reproducing device which is currently reproducing content, a first signal comprising an identifier of the content which is being currently reproduced by the content reproducing device, content access information that is used to access the content, and single intensity information of the first signal, wherein the signal intensity information of the first signal is contained in the first signal together with the identifier and the content access information, monitor the signal intensity information of the first signal which is periodically received from the content reproducing device, to determine a degree of proximity between the portable device and the content reproducing device based on the signal intensity information contained in the first signal, in response to a value of the signal intensity information being lower than a predefined threshold value, control the display to display a user interface (UI) comprising a message for inquiring about whether to start continuously reproducing by the portable device, the content corresponding to the identifier of the content included in the first signal, in response to receiving a first user input to start continuously reproducing the content by the portable device, obtain the content being reproduced by the content reproducing device using the identifier of the content and the content access information, and reproduce the obtained content.

2. The portable device of claim 1, wherein the content access information comprises at least one from among a uniform resource locator (URL), an identifier of a content providing server that provides the content, and an identifier of a content providing application program that provides the content.

3. The portable device of claim 1, wherein the first signal further comprises time information, and the controller is further configured to control the content being reproduced by the content reproducing device to be continuously reproduced based on the time information.

4. The portable device of claim 1, wherein the signal intensity information comprises at least one from among transmission power information and a received signal strength indicator (RSSI).

5. The portable device of claim 1, wherein the controller is further configured to transmit a second signal comprising information about content being reproduced by the portable device to the content reproducing device.

6. The portable device of claim 1, wherein the first signal comprises a Bluetooth beacon signal.

7. The portable device of claim 1, wherein:
the content access information comprises the identifier of the content providing application program that provides the content; and
the controller is further configured to determine whether the content providing application program is installed on the portable device and control the display to output a notification for inquiring about whether to install the content providing application program and whether to continuously reproduce the content using the content providing application program.

8. The portable device of claim 1, wherein the controller is further configured to transmit, to the content reproducing device, a command that instructs the content reproducing device to reproduce the content being reproduced by the portable device in response to a second user input of selecting continuous play while the portable device is currently reproducing content.

9. A portable device comprising:
a communication interface; and
a controller configured to:
periodically transmit, to a content reproducing device, a first signal comprising an identifier of content being reproduced by the portable device, content access information that is used to access the content, and transmission power information of the first signal and receive, from the content reproducing device, a received signal strength indicator (RSSI) of the first signal that is measured by the content reproducing device, wherein the content access information comprises an identifier of a content providing application that reproduces the content, periodically determine a degree of proximity between the portable device and the content reproducing device based on the transmission power information and the RSSI, while a connection between the portable device and the content reproducing device is maintained, in response to the determined degree of proximity being greater than a predefined threshold value, output a user interface comprising a message for inquiring about whether to start continuously reproducing by the content reproducing device the content being reproduced by the portable device, and in response to receiving a first user input to select to start continuously reproducing the content by the content reproducing device, transmit, to the content reproducing device, a command that instructs the content reproducing device, based on the identifier of the content and the identifier of the content providing application contained in the first signal, to reproduce the content being reproduced by the portable device while the connection between the portable device and the content reproducing device is maintained.

10. The portable device of claim 9, wherein the controller is further configured to transmit, to the content reproducing device, a wake-up command that instructs, in response to the first user input of selecting continuous play, the content reproducing device in a standby mode to supply power to internal components of the content reproducing device to switch the standby mode to a normal mode in which the content is reproduced.

11. The portable device of claim 9, wherein the controller is further configured to receive, from the content reproducing device, the identifier of the content and the content access information, and reproduce the content, in response to a second user input of selecting continuous play while the portable device is currently reproducing content.

12. A method of operating a portable device, the method comprising:
periodically receiving, from a content reproducing device which is currently reproducing a content, a first signal comprising an identifier of the content which is being currently reproduced by the content reproducing device, content access information that is used to access the content, and signal intensity information of the first signal, wherein the signal intensity information of the first signal is contained in the first signal together with the identifier and the content access information;

monitoring the signal intensity information of the first signal which is periodically received from the content reproducing device, to determine a degree of proximity between the portable device and the content reproducing device based on the signal intensity information contained in the first signal;

in response to a value of the signal intensity information being lower than a predefined threshold value, outputting a user interface comprising a message for inquiring about whether to start continuously reproducing by the portable device the content corresponding to the identifier of the content included in the first signal; and in response to receiving a first user input to start continuously reproducing the content by the portable device, obtaining the content being reproduced by the content reproducing device using the identifier of the content and the content access information and reproducing the obtained content on the portable device.

13. The method of claim 12, wherein the content access information comprises at least one from among a uniform resource locator (URL), an identifier of a content providing server that provides the content, and an identifier of a content providing application program that provides the content.

14. The method of claim 12, further comprising transmitting a second signal comprising information about content being reproduced by the portable device to the content reproducing device.

15. An operating method of a portable device, the method comprising:
- periodically transmitting, to a content reproducing device, a first signal comprising an identifier of content being reproduced by the portable device, content access information that is used to access the content, and transmission power information of the first signal, and receiving, from the content reproducing device, a received signal strength indicator (RSSI) of the first signal that is measured by the content reproducing device, wherein the content access information comprises an identifier of a content providing application that reproduces the content;
- periodically determining a degree of proximity between the portable device and the content reproducing device based on the transmission power information and the RSSI, while a connection between the portable device and the content reproducing device is maintained;
- in response to the determined degree of proximity being greater than a predefined threshold value, outputting a user interface comprising a message for inquiring about whether to start continuously reproducing by the content reproducing device the content being reproduced by the portable device; and
- in response to receiving a first user input to select to start continuously reproducing the content by the content reproducing device, transmitting, to the content reproducing device, a command that instructs the content reproducing device, based on the identifier of the content and the identifier of the content providing application contained in the first signal, to reproduce the content on the portable device while the connection between the portable device and the content reproducing device is maintained.

16. The method of claim 15, further comprising transmitting, to the content reproducing device, a wake-up command that instructs, in response to the first user input of selecting continuous play, the content reproducing device in a standby mode to supply power to internal components of the content reproducing device to switch the standby mode to a normal mode in which the content is reproduced.

* * * * *